US007616293B2

(12) United States Patent
Sirota et al.

(10) Patent No.: US 7,616,293 B2
(45) Date of Patent: Nov. 10, 2009

(54) SYSTEM AND METHOD FOR TRAFFIC MONITORING, SPEED DETERMINATION, AND TRAFFIC LIGHT VIOLATION DETECTION AND RECORDING

(75) Inventors: J. Marcos Sirota, Takoma Park, MD (US); Antonios Seas, Ellicott City, MD (US); Christopher Field, Baltimore, MD (US); Marzouk Marzouk, Annapolis, MD (US)

(73) Assignee: Sigma Space Corporation, Lannam, MD (US)

( * ) Notice: Subject to any disclaimer, the term of this patent is extended or adjusted under 35 U.S.C. 154(b) by 527 days.

(21) Appl. No.: 11/118,540

(22) Filed: Apr. 29, 2005

(65) Prior Publication Data

US 2005/0242306 A1 Nov. 3, 2005

Related U.S. Application Data

(60) Provisional application No. 60/566,539, filed on Apr. 29, 2004, provisional application No. 60/583,559, filed on Jun. 28, 2004.

(51) Int. Cl.
*G01P 3/36* (2006.01)
(52) U.S. Cl. .................. 356/28; 356/28.5
(58) Field of Classification Search .......... 356/28, 356/3.01–3.15, 4.01–4.1, 5.01–5.15, 6–22, 356/28.5
See application file for complete search history.

(56) References Cited

U.S. PATENT DOCUMENTS

| | | | |
|---|---|---|---|
| 3,532,886 A | 10/1970 | Kruger, Jr. et al. | 250/83.3 |
| 3,623,057 A | 11/1971 | Henn | |
| 4,690,550 A | 9/1987 | Kuhne | |
| 5,066,950 A | 11/1991 | Schweitzer et al. | 340/937 |
| 5,221,956 A * | 6/1993 | Patterson et al. | 356/28 |
| 5,227,784 A | 7/1993 | Masamori | |
| 5,243,553 A * | 9/1993 | Flockencier | 356/5.03 |
| 5,321,490 A | 6/1994 | Olson et al. | 356/5 |
| 5,546,188 A | 8/1996 | Wangler et al. | 356/376 |
| 5,680,120 A | 10/1997 | Tilleman | |
| 5,757,472 A | 5/1998 | Wangler et al. | 356/4.01 |
| 5,793,491 A | 8/1998 | Wangler et al. | 356/376 |
| 5,896,190 A * | 4/1999 | Wangler et al. | 356/4.01 |
| 6,111,523 A | 8/2000 | Mee | 340/937 |
| 6,188,469 B1 | 2/2001 | Liou et al. | 356/28 |
| 6,366,219 B1 | 4/2002 | Hoummady | 340/907 |
| 6,373,402 B1 | 4/2002 | Mee | 340/937 |
| 6,404,506 B1 | 6/2002 | Cheng et al. | 356/634 |
| 6,466,260 B1 | 10/2002 | Hatae et al. | 348/149 |
| 6,476,943 B1 * | 11/2002 | Yertoprakhov | 359/15 |
| 6,546,119 B2 | 4/2003 | Ciolli et al. | 382/104 |
| 6,573,929 B1 | 6/2003 | Glier et al. | 348/149 |
| 6,614,536 B1 | 9/2003 | Doemens et al. | 356/601 |

(Continued)

*Primary Examiner*—Thomas H Tarcza
*Assistant Examiner*—Luke D Ratcliffe

(57) ABSTRACT

A system of lasers and detectors to detect the presence of objects and determine their speed is disclosed. The system comprises of a pair of lasers and a pair of detectors focused through a single lens or a pair of lenses. An electronic board that accompanies the lasers and detectors is used to provide the logic and decision making mechanism. Data collected and processed by the system yields such information as whether an object is present, whether the object is stationary or is moving, and subsequent speed information. The described system is also capable of providing additional information concerning the characteristics of the moving object such as its profile and length, and indication of a traffic violation.

24 Claims, 24 Drawing Sheets

U.S. PATENT DOCUMENTS

| | | |
|---|---|---|
| 6,943,868 B2* | 9/2005 | Haig .......................... 356/5.01 |
| 2002/0012534 A1 | 1/2002 | Kibayashi et al. ........... 396/205 |
| 2002/0024652 A1* | 2/2002 | Ooga ......................... 356/28.5 |
| 2002/0054210 A1 | 5/2002 | Glier et al. .................. 348/149 |
| 2002/0063858 A1* | 5/2002 | Patterson ..................... 356/28 |
| 2002/0186297 A1 | 12/2002 | Bakewell ..................... 348/118 |
| 2003/0020633 A1 | 1/2003 | Lee ............................ 340/907 |
| 2003/0080878 A1 | 5/2003 | Kirmuss ..................... 340/936 |
| 2005/0046821 A1* | 3/2005 | Hanson et al. ............. 356/3.01 |

\* cited by examiner

Flowcharts (a) Speed estimate using the front of a vehicle (b) Speed estimate using the back of a vehicle, (c) Speed estimate using both the front and back of a vehicle to calculate an average speed Pulse detected before programmable time delay (Δτ) expired, vehicle present Vehicle profiling by using delays (Δt1, Δt2, ...) generated by delay counter (a) General concept for the source of speed uncertainty due to repetition rate.
(b) Details of speed uncertainties Speed estimation uncertainty due to pulse repetition frequency as a function of the vehicle's speed. (a) Laser spot separation (d) 0.5-meter (b) Laser spot separation 1.0 meters (a)

(b)

Speed estimation uncertainty as a function of vehicle speed for various laser spot sizes.
(a) Laser spot separation (d) 0.5-meter (b) Laser spot separation 1.0 meters (a)

(b)

SYSTEM AND METHOD FOR TRAFFIC MONITORING, SPEED DETERMINATION, AND TRAFFIC LIGHT VIOLATION DETECTION AND RECORDING

CROSS REFERENCE TO RELATED APPLICATION

This application is based upon and claims benefit of and co-owned U.S. Provisional Patent Application Ser. No. 60/566,539 entitled "System and Method for Sensing an Object and Determining the Speed of Same," filed with the U.S. Patent and Trademark Office on Apr. 29, 2004 by the inventors herein, and and co-owned U.S. Provisional Patent Application Ser. No. 60/583,559 entitled "System and Method for Traffic Monitoring, Speed Determination, and Traffic Light Violation Detection and Recording," filed with the U.S. Patent and Trademark Office on Jun. 28, 2004 by the inventors herein, the specifications of which are incorporated herein by reference.

BACKGROUND OF THE INVENTION

Field of the Invention

This invention relates to a system and method for detecting the presence of an object and more particularly the invention relates to systems and methods for monitoring and recording the activity of traffic in a controlled intersection.

SUMMARY OF THE INVENTION

A system and method for traffic monitoring, vehicle speed determination and traffic light violation detection and recording is disclosed. In a preferred embodiment of the invention, the system and method are capable of monitoring traffic in an intersection/highway, measure vehicle speed, identify potential traffic violations, and trigger a visual recording device such as a camera or video system. The method and system can also serve as a tool for use by law enforcement agencies and research groups for other applications such as measurement of traffic density, monitoring vehicle speed, and studying traffic patterns. One of the potential applications of the system is to monitor and record red light violations. The disclosed system relies on generation of laser light and the detection of the scattering of such radiation off the road surface or intervening object to determine the presence of a car, estimate its speed, determine when a violation is likely to occur (based on predetermined criteria), and trigger a recording mechanism for collecting evidence of the violation.

BRIEF DESCRIPTION OF THE DRAWINGS

The above and other features, aspects, and advantages of the present invention are considered in more detail, in relation to the following description of embodiments thereof shown in the accompanying drawings, in which:

FIG. 2($b$) is a schematic drawing of main parts and overall arrangement of a Laser system according to another embodiment of the present invention.

FIG. 2($c$) shows a principle of operation of a system according to the present invention.

DETAILED DESCRIPTION

The invention summarized above and defined by the enumerated claims may be better understood by referring to the following description, which should be read in conjunction with the accompanying drawings. This description of an embodiment, set out below to enable one to build and use an implementation of the invention, is not intended to limit the invention, but to serve as a particular example thereof. Those skilled in the art should appreciate that they may readily use the conception and specific embodiments disclosed as a basis for modifying or designing other methods and systems for carrying out the same purposes of the present invention. Those skilled in the art should also realize that such equivalent assemblies do not depart from the spirit and scope of the invention in its broadest form.

Figure 1:
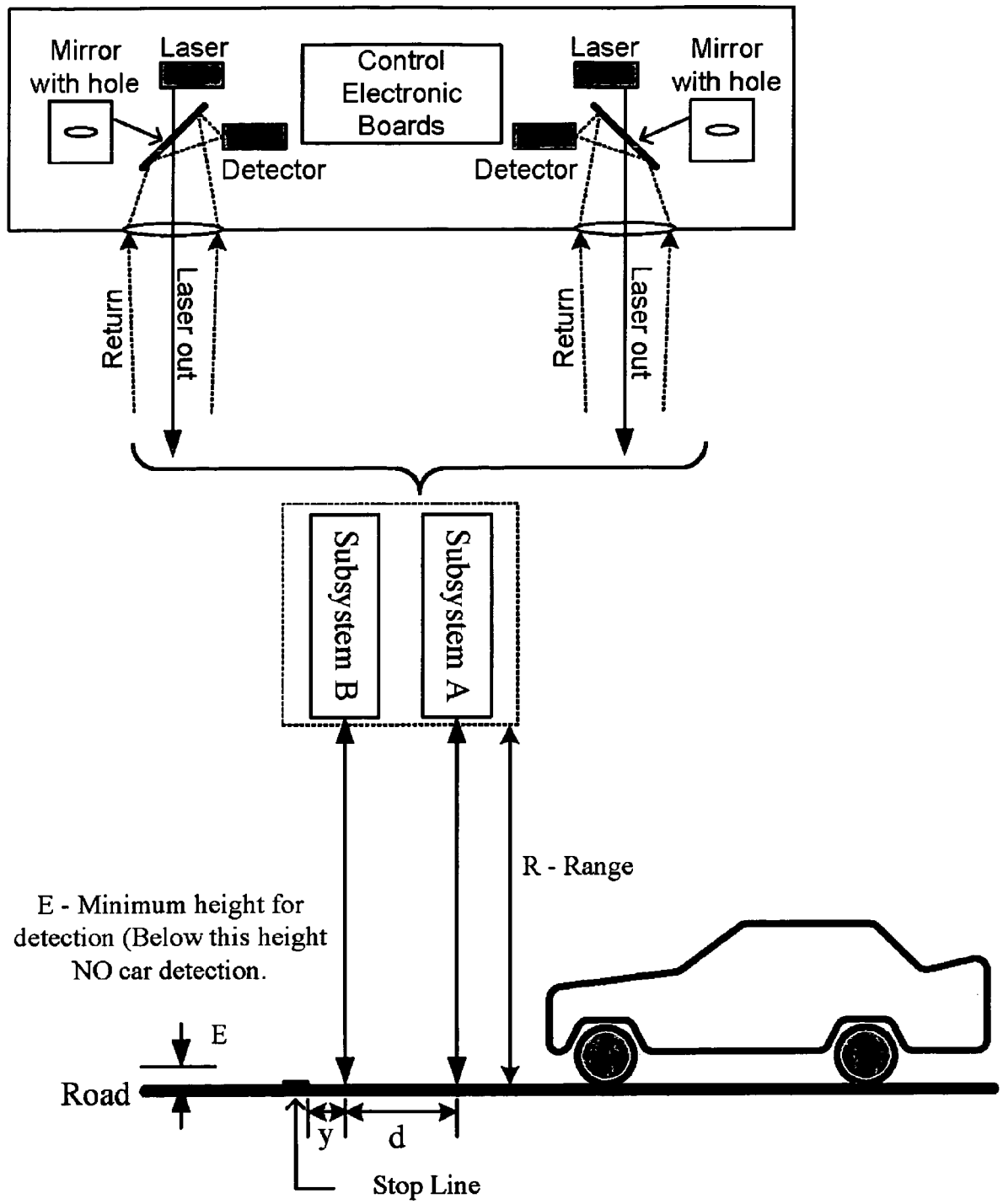
FIG. 1 illustrates a schematic of a detection system according to a first embodiment of the present invention.

The overall system is shown in FIG. 1. The system consists of two subsystems A and B each containing a laser and a sensor. The lasers are preferably powered and controlled by a common unit, namely, the control electronic boards, which include electrical power transforming/conditioning electronics and pulse generating electronics. Laser pulses from the two lasers are directed towards the road's surface. Part of the scattered/reflected light is collected and focused onto the sensors. A Master Controller Circuit processes signals generated by the two sensors and generates an output trigger signal when appropriate for a recording media, such as a camera or a video recording device.

Figure 2A:
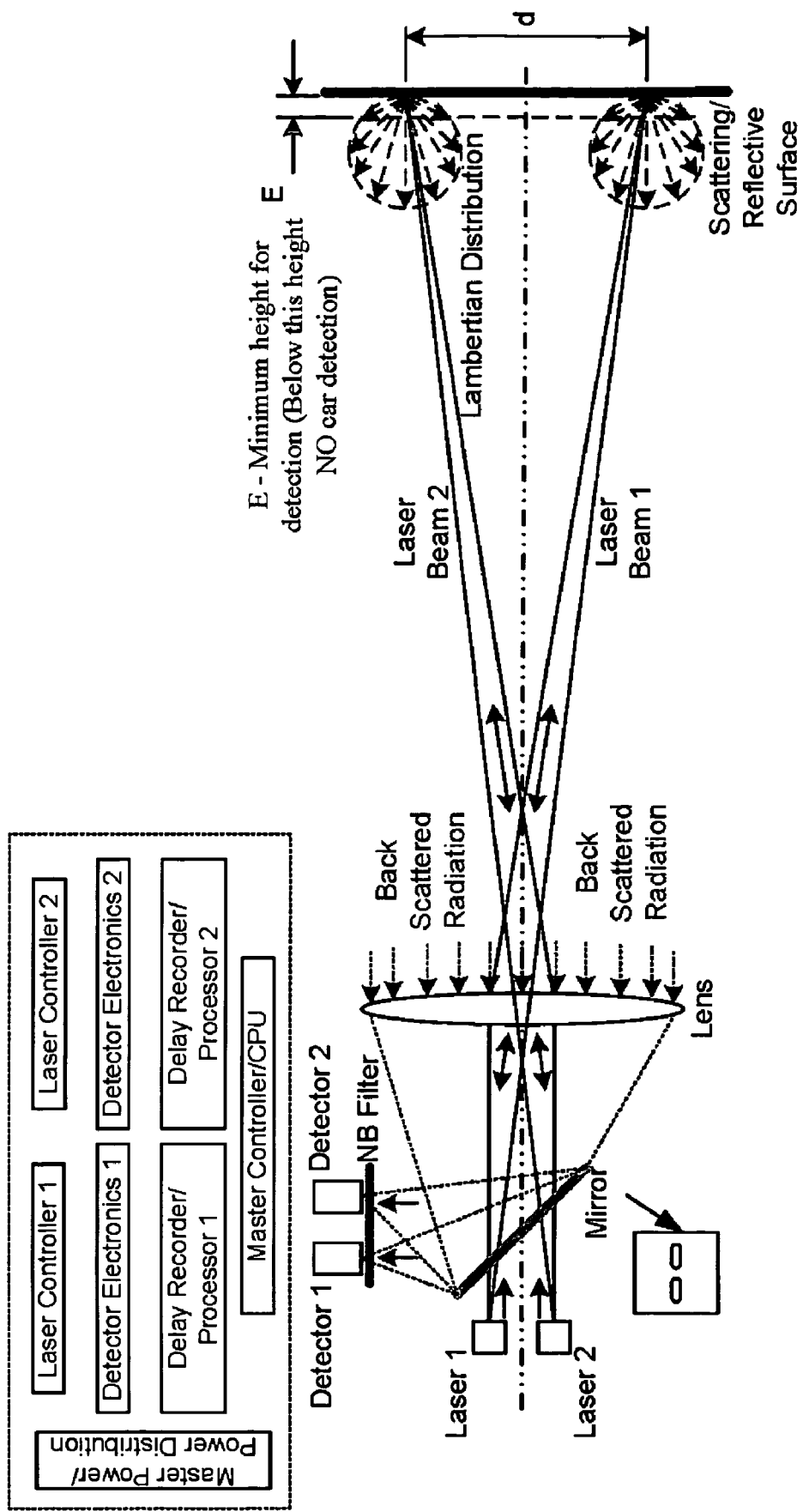
FIG. 2($a$) is a schematic drawing of main parts and overall arrangement of a Laser system according to a first embodiment of the present invention.
Figure 2B:
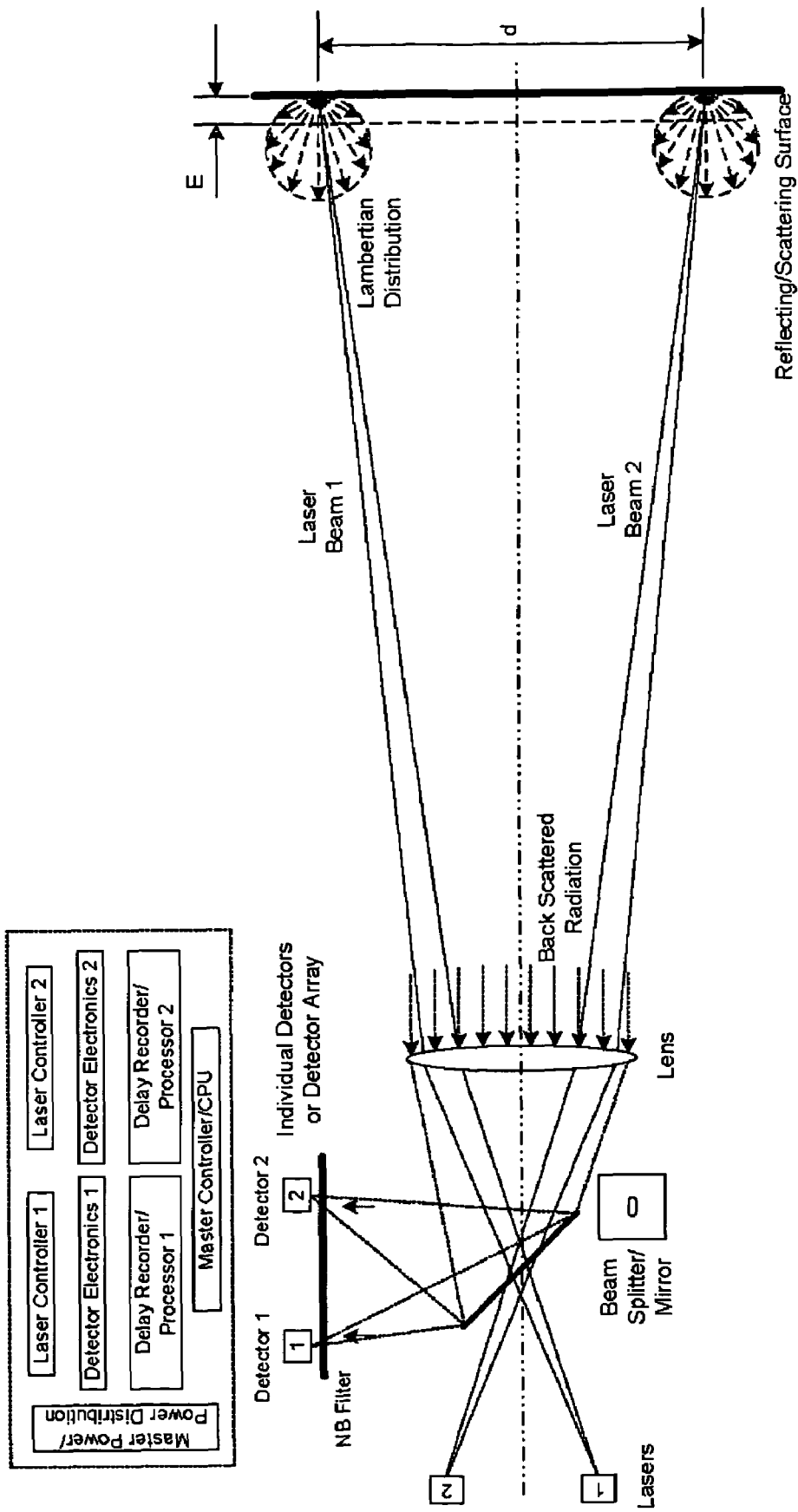

FIGS. 2(a) and (b) show the main parts and overall arrangement of a single lens speed sensor system according to the present invention. The sensor system includes two lasers (preferably diode lasers for compactness), two detectors (or an array of detectors), a lens, a mirror (or beam splitter), and several electronic boards for power conditioning and distribution, information recording, and decision-making. In FIG. 2(a), there are two holes in the mirror (beam splitter), one for each laser beam, to allow the beam from the lasers to pass through. In FIG. 2(b), a single hole is in the mirror and the lasers are configured such that both laser beams pas through the same aperture in the middle of the mirror.

Each laser with its associated laser controller generates short pulses at high frequency. The duration of the optical pulses and the repetition frequency are a function of the desired speed accuracy, and can be adjusted according to the needs of the specific application. Short optical pulses in conjunction with high frequency lead to high accuracy in evaluating vehicle/object speed and other information from the recorded data. Reducing the frequency or increasing the pulse width decreases the system accuracy. Another factor that affects the system accuracy is the separation d between the two laser beams, described in more detail below. The beam separation can serve as an accuracy adjustment in order to satisfy requirements for specific applications.

The optical principle that provides the basis for operation of the disclosed system is scattering of optical radiation when it encounters a solid surface. It is always true that a small percentage of incident optical radiation on a surface (interface) will be scattered in many directions in addition to the other optical phenomena such as reflection and refraction. This is also true for shiny surfaces since a short exposure to open air will contaminate the surface enough to enable light scattering. The disclosed system relies on a small percentage of scattered optical radiation to be detected and to generate an electrical signal thru the use of a sensitive optical detector. The generated electrical signal is, in turn, used to trigger electronic processes and logic algorithms that enable the system to detect the presence of an object/vehicle.

Figure 2C:
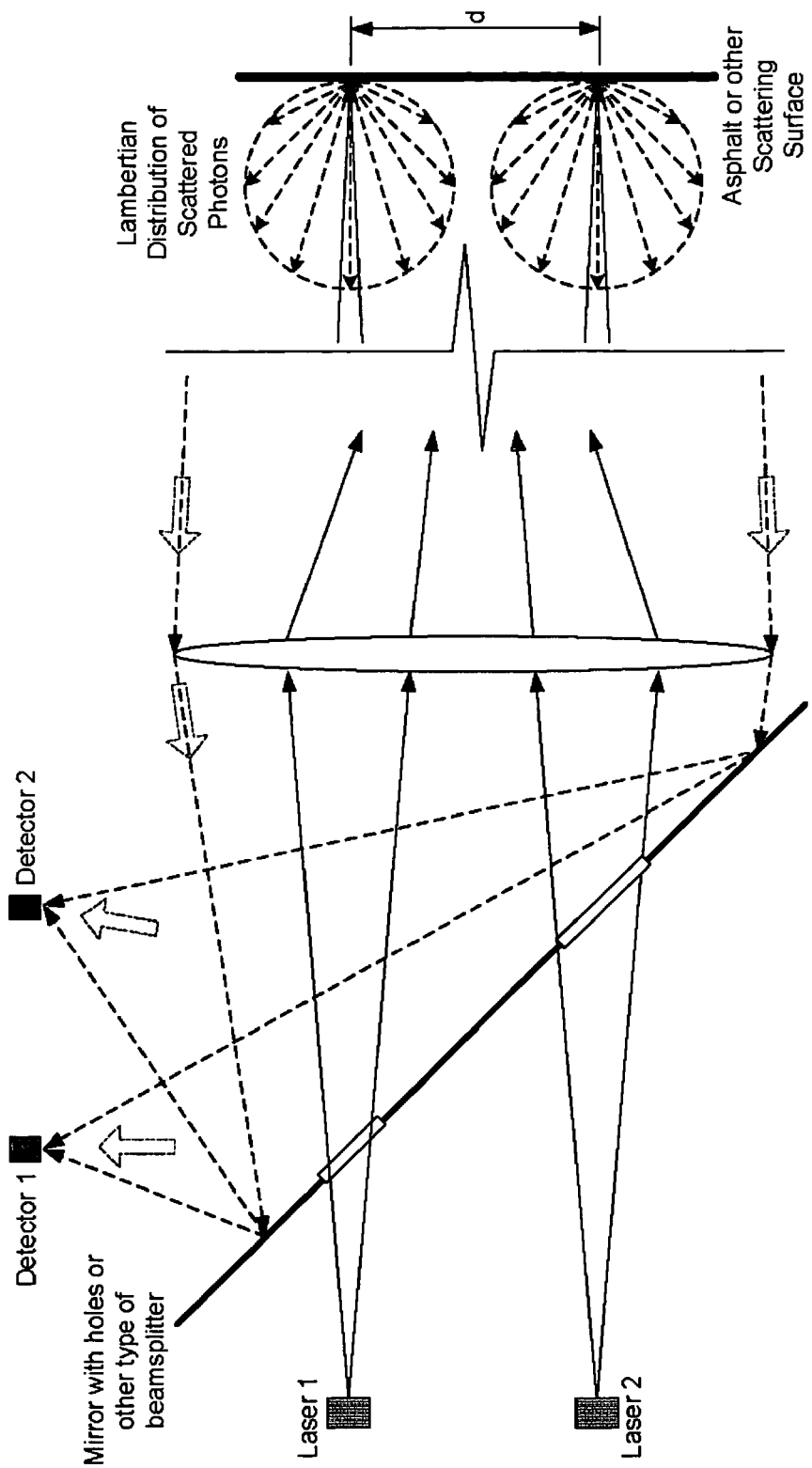

The schematic in FIG. 2(c) provides more details of the basic optical principles that enable the operations of the disclosed speed sensor system. Two lasers generate optical radiation that is directed through an aperture or apertures on the mirror (beam splitter). In the special case that diode lasers are used (which are more divergent than traditional lasers), the hole(s) on the mirror serve as specialized apertures to control and/or shape the beam profile. Another function of the apertures may be to limit the maximum output optical radiation. A dielectric coated beam splitter can also be used instead of a mirror with holes. Next, the optical radiation travels through the lens and is focused onto the desired surface. In the case of a traffic system, the two lasers are focused onto or above the asphalt surface. After hitting the surface the optical radiation is scattered in all directions as shown in FIG. 2(c), where it is assumed that the distribution of the scattered radiation has a Lambertian profile. A small portion of the scattered photons follows exactly the opposite direction (as compared to their initial direction before being scattered) and is collected by the lens. The lens, with the aid of the mirror (beam splitter), focuses all collected optical radiation onto a detector. It is important to note that most of the return photons are deflected by the mirror and focused onto the detectors rather than going through the mirror hole(s). This is due to the fact that the returned photons are spread throughout the lens surface. The assumption of Lambertian distribution for the scattered radiation suggests that it is advantageous to position the system in such a way as to minimize the angle of incidence on the reflective/scattering surface. The angle of incidence is defined as the angle between the beam direction and the perpendicular to the scattering surface at the point of contact.

As is the case with many optical systems, it is possible to interchange the position of the lasers and the detectors provided that the mirror (beam splitter) instead of having holes for the beam to go through, it will have one or more areas of high reflectivity for the beams to be reflected.

The overall principle of operation of the speed sensor system and the various functions performed to estimate the speed are outlined below:

1. The electronic boards controlling the two diode lasers provide direct current modulation to the diode laser resulting in the generation of short optical laser pulses. The duration of the laser pulses is in the order of few nanoseconds (4 ns pulses were used during experimental verification of the disclosed system) while the frequency of the pulses is in the order of few kHz, (a pulse repetition rate of 10 kHz was used during experiments). As previously noted, the accuracy of the speed sensor is a function of the pulse duration, the frequency of pulses or pulse repetition rate, and the laser beam separation on the scattering surface.
2. The two laser beams travel through the mirror hole(s) (as shown in FIGS. 1, and 2(a)-(c)) and are focused on or above the surface under surveillance using the lens.
3. Before the optical pulses leave the system assembly, a small portion is directed towards the detectors. The signals generated are used to trigger corresponding delay counters dedicated to measure how long it takes before the two optical pulses return back to the system (after they have been scattered by a surface).
4. When the two laser pulses encounter a surface several phenomena can take place such as reflection, refraction, and scattering. Unless the surfaces are extremely clean, a small part of the incident radiation scatters in all directions. Part of the scattered optical radiation travel exactly the opposite way as compared to the initial beam direction, and is collected by the lens that focuses incoming light onto the image plane (where the two detectors are located).

Figure 3:
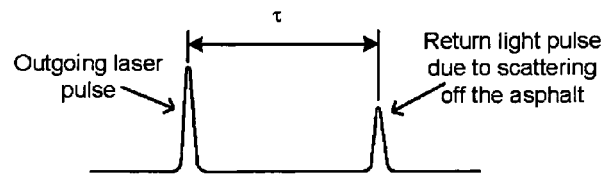
FIG. 3 illustrates the time delay for estimating the range between the disclosed system and the ground.

5. When the collected optical radiation reaches the two detectors electrical signals are generated, which trigger the delay counters to stop counting. The time delay between the outgoing laser pulse and the collected scattered radiation is recorded. This is the information needed to estimate the range between the system and the scattering surface. The range is estimated using the expression:

$$r = c\frac{\tau}{2} \qquad (1)$$

where:
c—the speed of light (approximately 300,000 km per second); and
τ—the time delay (see FIG. 3).
Note that the recorded time delay, τ, is divided by 2 in the expression above. This is done since the recorded time delay corresponds to the round trip.

Figure 4:
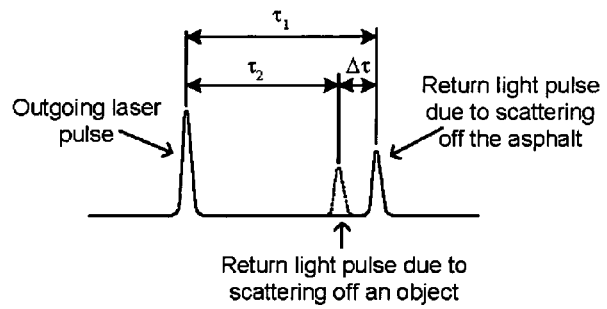
FIG. 4 illustrates the time delay for estimating the range between the disclosed system and an object above the ground.

6. In the case that a vehicle/object intersects the laser beam instead of the road surface, a shorter delay is recorded. The height of the vehicle/object can then be estimated using the expression:

$$h = c\left(\frac{\tau_1 - \tau_2}{2}\right) = c\frac{\Delta\tau}{2} \qquad (2)$$

where:
Δτ—the difference between the time delay corresponding to the asphalt surface and the time delay corresponding to the object's surface (see FIG. 4).

Using the recorded delay in conjunction with the signal strength, the presence/absence of a vehicle can be determined using the analysis as illustrated in Table 1, below. Column 1 lists the various possibilities and column 2 contains the criterion used for the conclusion.

Chart 1: Conditions for detecting the presence of a vehicle.

CHART 1

Conditions for detecting the presence of a vehicle.

Figure 7:
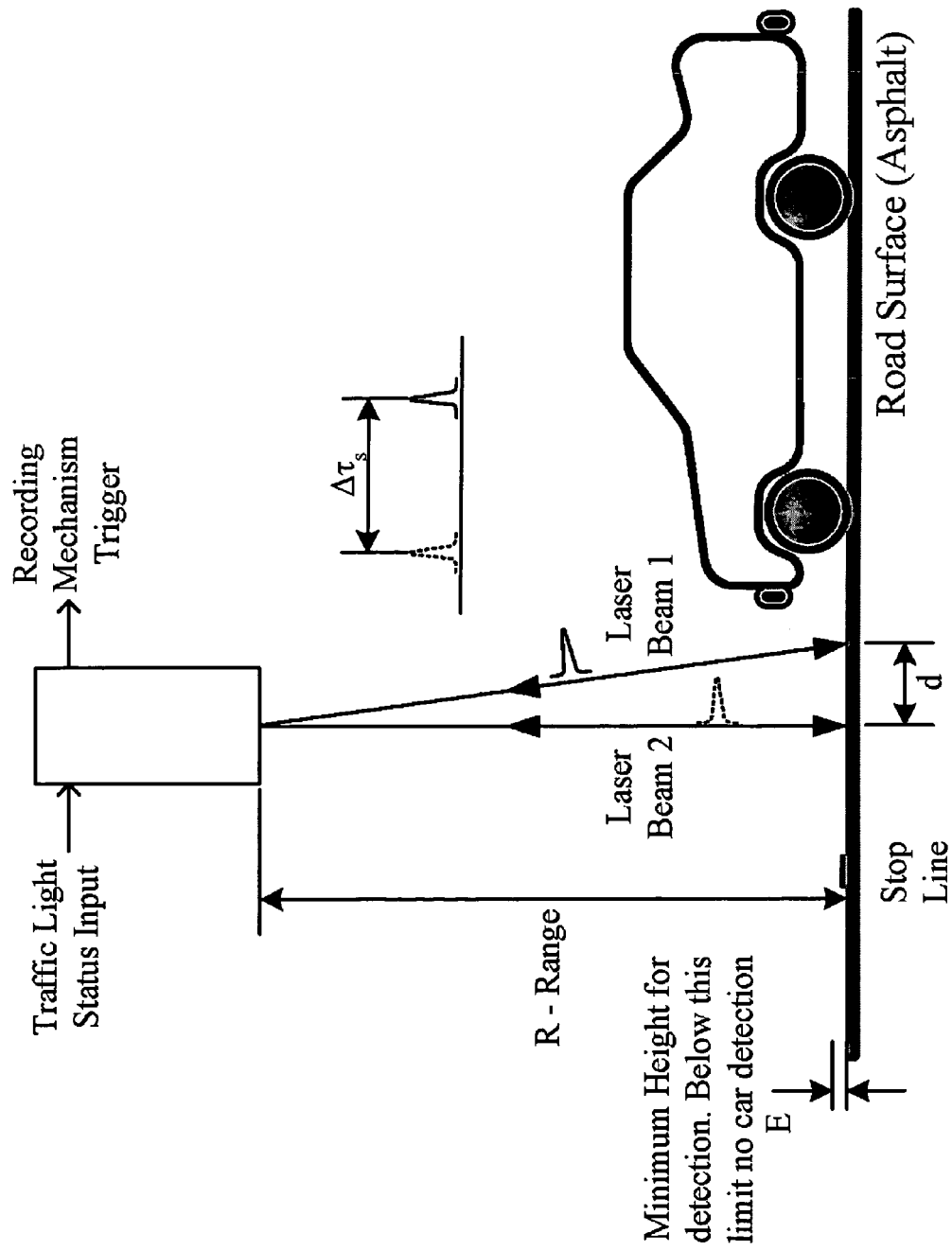
FIG. 7 illustrates a schematic of the detection system according to a first embodiment of the present invention.

| | |
|---|---|
| NO VEHICLE PRESENT | The recorded time delay is slightly longer or equal to the delay corresponding to the "Range - Minimum height for vehicle detection" (R-E) as indicated in FIG. 7, and there is no change in the signal strength (See Note 1 below) as recorded by the detectors. |
| VEHICLE PRESENT | The recorded time delay is shorter as compared to the delay corresponding to R-E, and/or there has been a change in the signal strength (See Note 1 below) as recorded by the detectors. |

Note 1:
A change in the signal strength is defined as either an increase or decrease of the recorded voltage. In most cases, the change corresponds to a decrease of the signal strength due to slight misalignment of the optical sensors. There are however exceptional cases where an increase of the signal's strength can be observed due to high reflectivity of a car's surface aided by reflecting/scattering alignment conditions.

Figure 5:
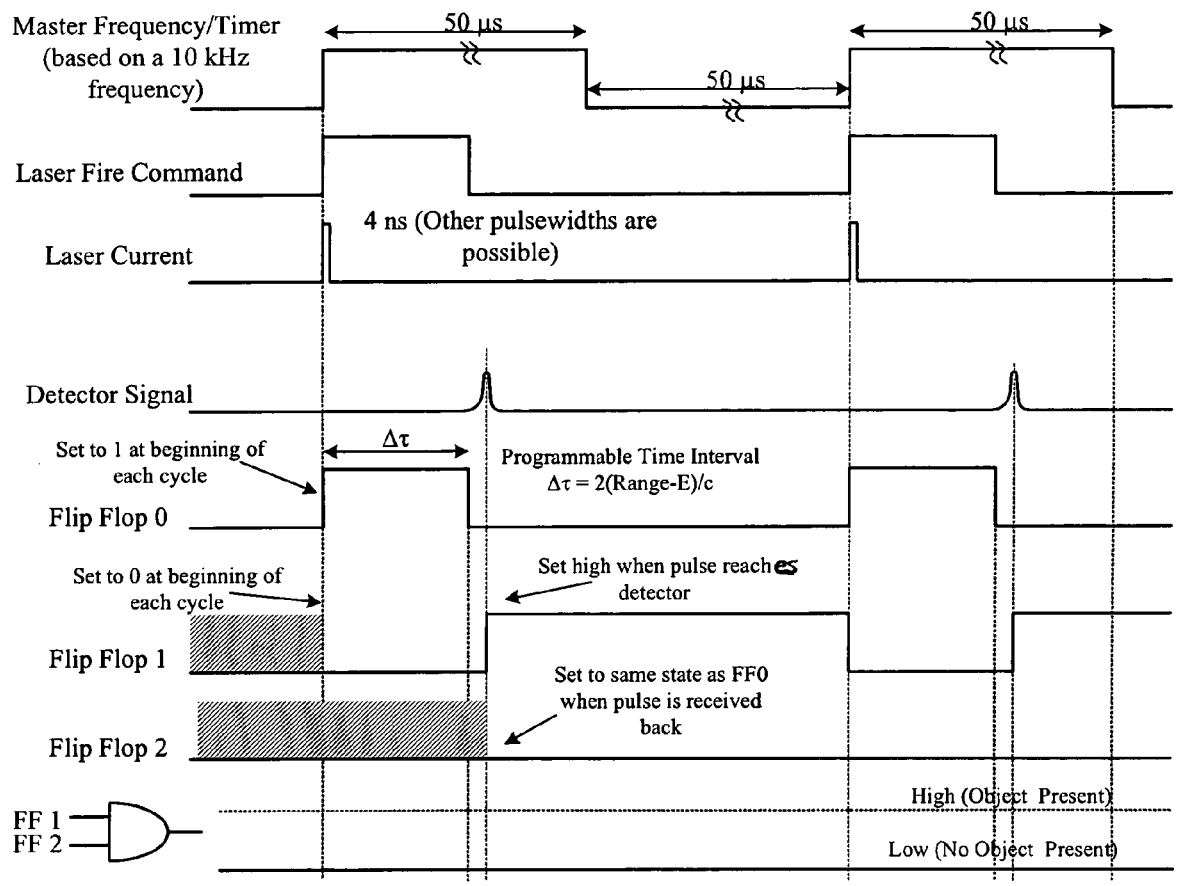
FIG. 5 illustrates a timing diagram detecting absence of an object according to a first embodiment of the present invention.
Figure 6:
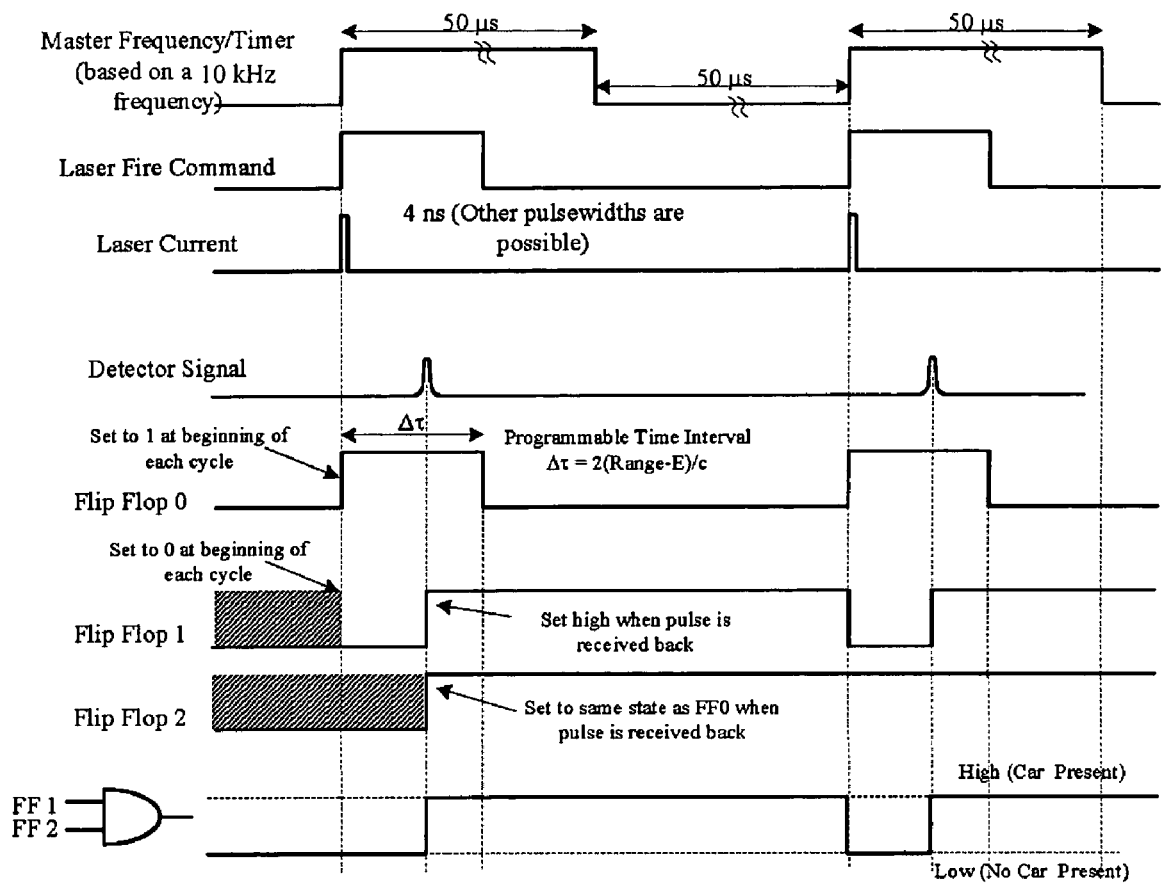
FIG. 6 illustrates a timing diagram detecting presence of an object according to a first embodiment of the present invention.

The method used for determining the presence/absence of a vehicle from an intersection is further illustrated in the timing diagrams shown in FIGS. 5 and 6. FIG. 5 shows the timing diagram for both lasers when there is no vehicle present, while FIG. 6 illustrates the case when a vehicle is present. Flip-flops 0, 1, and 2 may be used as part of the control circuit to compare the range to a threshold as shown in FIG. 1. The function of the three flip-flops can be implemented in a microprocessor or the range can be measured by a time interval measuring apparatus and compared to a threshold as follows:

Flip-flop 0 (FF0) is set to state one (high) at the beginning of each cycle and is reset to zero state (or low) after a programmable delay that corresponds to the range between the sensor and the asphalt.

Flip-flop 1 (FF1) is set to zero state (or low) at the beginning of each cycle and is set to state one (high) when the pulse reaches the detector.

Flip-flop 2 (FF2) is set to the same state as FF0 when the return pulse reaches the detector.

A final decision is made by combining the outputs of FF1 and FF2 through an AND gate. If the output of the AND gate is set to zero it means that no vehicle is present, while if it is high it indicates the presence of a vehicle. In a preferred embodiment, the flip-flops are replaced by electronic timing circuits for timing return pulses.

Figure 8:
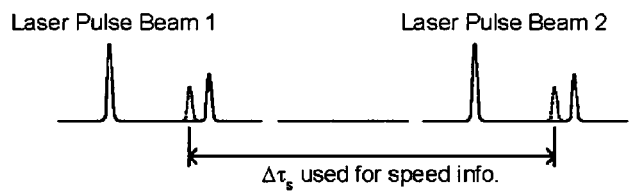
FIG. 8 illustrates a timing diagram for estimating the speed of a moving object according to a first embodiment of the present invention.
Figure 14:
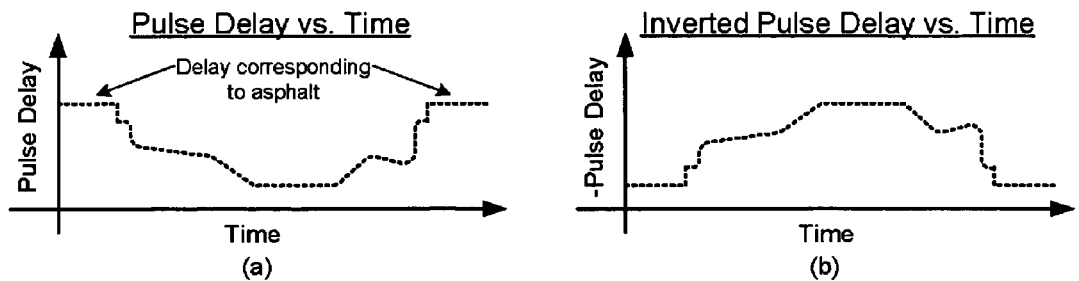
FIGS. 14($a$)-($b$) illustrates the pulse delay as recorded corresponding to a passing vehicle according to additional features of the present invention.

7. In the case that the speed of a moving object is needed, the time delay between the first pulse of "Laser beam 1" interrupted by the object's surface and the first pulse of "Laser beam 2" interrupted by the moving object, $\Delta\tau_s$, needs to be measured. This is shown in FIG. 7, where it is assumed that an object is moving from laser beam 1 to laser beam 2. The speed of the moving object can be estimated using the expression $$v = \frac{d}{\Delta\tau_s} \qquad (3)$$

where:
d—Beam separation give by R * sin(θ) where θ is the angle between the vertical beam and the slope beam; and
$\Delta\tau_s$—time delay between the first pulse of "Laser beam 1" interrupted by the object's surface and the first pulse of "Laser beam 2" interrupted (see FIG. 8).

Figure 9:
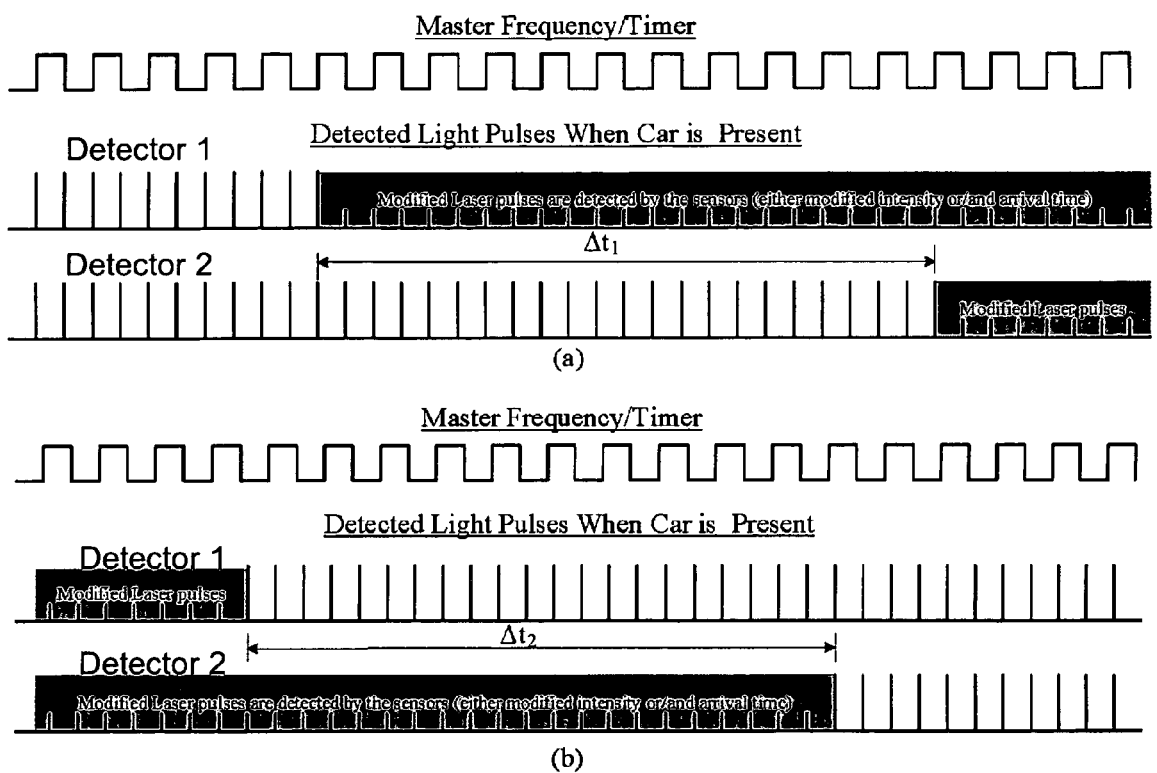
FIGS. 9($a$)-($b$) illustrate speed estimation principles using the front or rear of an object.

The speed of a moving vehicle can be estimated at two instances, one corresponding to the front of the vehicle, and the second corresponding to the back of the vehicle in conjunction with the separation d of the two laser beams (which is known and is a design parameter). Speed estimation using the output of the two detectors is illustrated in FIGS. 9(a)-(b).

Figure 10:
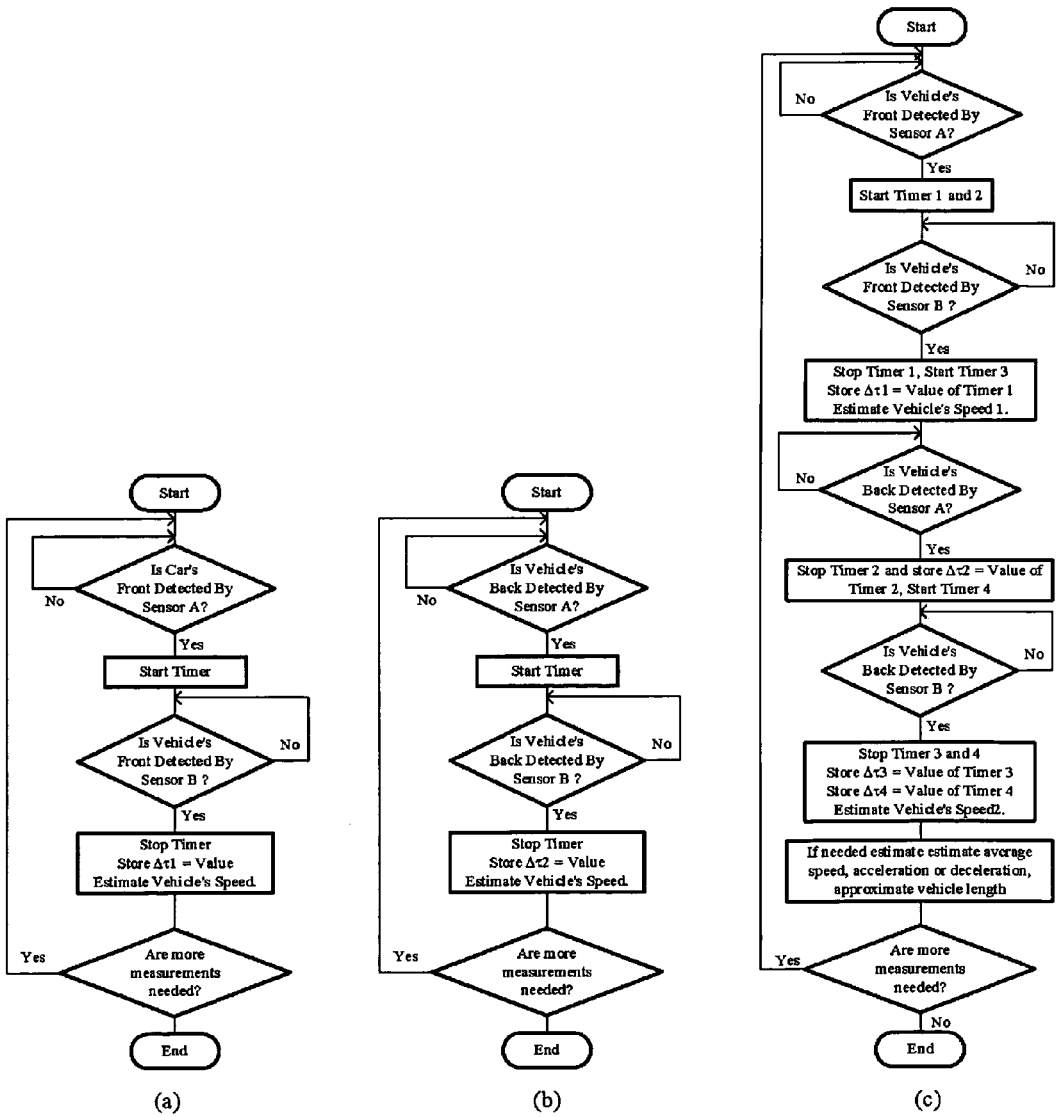
FIGS. 10($a$)-($c$) are flowcharts for estimating speed according to various alternate embodiments of the present invention.

The process for speed estimation of a moving vehicle is outlined in greater detail in flowcharts presented in FIGS. 10(a)-(c). As mentioned above there are two opportunities where the speed of a passing vehicle can be measured, one corresponding to the front of the vehicle, and one corresponding to the back of the vehicle. The flowcharts corresponding to these two cases are shown in FIGS. 10(a) and 10(b). A third method is also shown in FIG. 10(c), which considers both the values estimated for the front of the object and back of the object and, if desired, can estimate the object's average speed, acceleration, or deceleration.

The algorithms outlined in the flowcharts of FIGS. 10(a)-(c) for speed estimation are better described in the following tables where the logic steps are presented in greater detail. In the below tables and accompanying figures, Sensor A corresponds to Laser 1 and Detector 1 and Sensor B corresponds to Laser 2 and Detector 2.

TABLE 1

Steps for speed estimation using information recorded when the front of a vehicle intersects the laser beams of sensors A and B. (FIG. 10(a)).

| Item | Description |
|---|---|
| STEP 1 | Check output of sensor A. If the recorded signal strength is equal to (or within a small margin of) the signal strength corresponding to the road surface signal, and the signal's delay with respect to the laser firing corresponds to the road surface delay, then wait for next recording. If the recorded signal strength is different from the expected value, and/or the time delay is smaller than the one corresponding to the road surface, then trigger the timer to start. This means that the received signal corresponds to reflected/scattered radiation from the front of a vehicle intercepting the laser beam of sensor A (or in other words the recorded signal corresponds to reflection/scattering from a vehicle). |
| STEP 2 | Check the output of sensor B. If the recorded signal strength is equal to (or within a small margin of) the value corresponding to a return from the road surface, and the signal's time delay with respect to the laser firing corresponds to the delay corresponding to the road surface, then wait for next recording. If the recorded signal strength is different from the expected value, and/or the time delay is smaller than the one corresponding to the road surface, then trigger the timer to stop. This means that the received signal corresponds to reflected/scattered radiation from the front of a vehicle intercepting the laser beam of sensor B (or in other words the recorded signal corresponds to reflection/scattering from a vehicle). |
| STEP 3 | Record the value of timer ($\Delta\tau 1$) and calculate the speed of the vehicle using the expression $$\text{Vehicle Speed}_{front} = \frac{d}{\Delta\tau 1}$$ Where: <br> d = beam separation (See FIG. 1) <br> $\Delta\tau 1$ = Recorded timer value corresponding to the time it takes for the front of a vehicle to transverse the laser beam separation d. |

TABLE 2

Steps for speed estimation using information recorded when the back of a vehicle crosses the path of the laser beams of sensors A and B. For the following steps, prior knowledge of a vehicle presence based on previous recordings of sensors A and B and processing performed by the Timing Unit/Control Circuit is assumed. (FIG. 10(b)).

| Item | Description |
|---|---|
| STEP 1 | Check the output of sensors A and B. If the recorded signal strength values are equal (or within a small margin) to previously recorded values corresponding to a vehicle present and/or the time delay between the recorded signal and the laser firing signal is shorter than the time delay corresponding to reflection/scattering from the road surface, then wait for next recording. When recorded signal strength of sensor A is different, usually bigger (or in some cases smaller) than expected value and/or the time delay between the received signal and the laser firing has increased (corresponding to the time delay of the road surface), then trigger the timer to start. This means that the back of a vehicle has stopped blocking the laser beam of sensor A. |
| STEP 2 | Check output of sensor in sensor B. If the recorded signal strength is equal (or within a small margin) to previously recorded value corresponding to a vehicle present and/or the time delay between the received signal and the laser firing signal is shorter than the time delay corresponding to the road surface, then wait for next recording. If recorded signal strength is larger (or in some cases smaller) than expected value and/or the time delay is bigger than previous recordings (corresponding to the time delay of the road surface) then trigger the timer to stop. This means that the back of a vehicle has unblocked the laser beam of sensor B. |
| STEP 3 | Record the value of the timer ($\Delta\tau 2$) and calculate the speed of the vehicle using the equation $$\text{Vehicle Speed}_{back} = \frac{d}{\Delta\tau 2}$$ Where: <br> d = beam separation (See FIG. 1) <br> $\Delta\tau 2$ = Recorded timer value corresponding to the time it takes for the back of a vehicle to transverse the laser beam separation d |

The acceleration/deceleration of a moving vehicle can be estimated by comparing the speed estimates for the front and the rear of the moving vehicle and is given by the following expression.

$$\alpha = \frac{\Delta v}{\Delta t} = \frac{v_f - v_r}{\Delta t} \quad (4)$$

where:

α—Acceleration (deceleration is negative acceleration);
$v_f$—speed estimate for the front of the passing vehicle; and
$v_r$—speed estimate for the rear of the passing vehicle.

The ability to estimate acceleration/deceleration of a moving vehicle may prove to be significant since in applications such as red light photo enforcement this information can show whether a driver tried to stop to avoid running the red light, or whether the driver accelerate to beat the red light.

TABLE 3

The logic steps displayed in FIG. 10(c) is a combination of the steps outlined in FIGS. 10(a) and (b). Combining information regarding the speed of the front of a vehicle and the back of a vehicle, and considering additional information gathered using more timers, additional information for the passing vehicle can be estimated, such as acceleration/deceleration, average speed, and approximate vehicle length. (FIG. 10(c)).

| Item | Description |
|---|---|
| STEP 1 | Check output of sensor A. If the recorded signal strength is equal (or within a small margin) to signal strength corresponding to the road surface signal and the signal's delay with respect to the laser firing corresponds to the road surface, then wait for next recording. If the recorded signal strength is smaller (or in some cases larger) than expected value, and/or the time delay is smaller than the one corresponding to the road surface, then trigger timers 1 and 2 to start. This means that the received signal corresponds to reflected/scattered radiation from the front of a vehicle intercepting the laser beam of sensor A (or in other words the recorded signal corresponds to reflection/scattering from a vehicle). |
| STEP 2 | Check the output of sensor B. If the recorded signal strength is equal (or within a small margin) to the value corresponding to a return from the road surface, and the signal's time delay with respect to the laser firing corresponds to the road surface, then wait for next recording. If the recorded signal strength is smaller (or in some cases larger) than expected value, and/or the time delay is smaller than the one corresponding to the road surface, then trigger the timer 1 to stop and timer 3 to start. This means that the received signal corresponds to reflected/scattered radiation from the front of a vehicle intercepting the laser beam of sensor B (or in other words the recorded signal corresponds to reflection/scattering from a vehicle). |
| STEP 3 | Record the value of timer 1 ($\Delta\tau1$) and calculate the speed corresponding to the front of the vehicle using the expression $$\text{Vehicle Speed}_{front} = \frac{d}{\Delta\tau1}$$ Where: d = beam separation (See FIG. 1) $\Delta\tau1$ = Recorded timer 1 value corresponding to the time it takes for the front of a vehicle to transverse the laser beam separation d. |
| STEP 4 | Check the output of sensors A and B. If the recorded signal strength values are equal (or within a small margin) to previously recorded values corresponding to a vehicle present and/or the time delay between the received signal and the laser firing signal is shorter than the time delay corresponding to the road surface, then wait for next recording. When the recorded signal strength from sensor A is different, usually bigger (or in some cases smaller) than expected value and/or the time delay between the received signal and the laser firing has increased (corresponding to the time delay of the road surface), then trigger the timer 2 ($\Delta\tau2$) to stop and timer 4 to start counting. This means that the back of a vehicle has stopped blocking the laser beam of sensor A. |
| STEP 5 | Check output of sensor B. If the recorded signal strength is equal (or within a small margin) to previously recorded value corresponding to a vehicle present and/or the time delay between the received signal and the laser firing signal is shorter than the time delay corresponding to the road surface, then wait for next recording. If recorded signal strength is larger (or in some cases smaller) than expected value and/or the time delay is bigger than previous recordings (corresponding to the time delay of the road surface) then trigger timers 3 and 4 to stop recording ($\Delta\tau3$ and $\Delta\tau4$ respectively). This means that the back of a vehicle has unblocked the laser beam of sensor B. |
| STEP 6 | Record the value of timer 4 ($\Delta\tau4$) and calculate the speed of the vehicle using the equation $$\text{Vehicle Speed}_{back} = \frac{d}{\Delta\tau4}$$ |

TABLE 3-continued

The logic steps displayed in FIG. 10(c) is a combination of the steps outlined in FIGS. 10(a) and (b). Combining information regarding the speed of the front of a vehicle and the back of a vehicle, and considering additional information gathered using more timers, additional information for the passing vehicle can be estimated, such as acceleration/deceleration, average speed, and approximate vehicle length. (FIG. 10(c)).

| Item | Description |
|---|---|
| | Where:<br>d = beam separation (See FIG. 1)<br>Δτ4 = Recorded timer value corresponding to the time it takes for the back of a vehicle to transverse the laser beam separation d. |
| STEP 7 | In order to calculate average speed of the vehicle while crossing the laser beams, the following expression can be used:<br>$$\text{Vehicle Speed}_{averahe} = \frac{\text{Vehicle Speed}_{front} + \text{Vehicle Speed}_{back}}{2}$$ |
| STEP 8 | In order to determine whether the vehicle was accelerating or decelerating while crossing the path of the laser beams, one of the following two expressions can be used:<br>$$\text{Acceleration1} = \frac{\text{Vehicle Speed}_{back} - \text{Vehicle Speed}_{front}}{\Delta\tau 2}$$<br>$$\text{Acceleration2} = \frac{\text{Vehicle Speed}_{back} - \text{Vehicle Speed}_{front}}{\Delta\tau 3}$$<br>The average acceleration/deceleration may be estimated using the expression:<br>$$\text{Average Acceleration} = \frac{\text{Acceleration1} + \text{Acceleration2}}{2}$$<br>(Note: Deceleration can be considered as negative acceleration) |
| STEP 9 | Approximate vehicle length may be estimated using one of the following expressions:<br>If there is no measurable acceleration or deceleration then<br>Vehicle Length = Vehicle Speed × Δτ<br>Where:<br>Vehicle Speed can be either the one calculated when considering the front of a vehicle, or the one calculated when considering the back of a vehicle, or the calculated average speed.<br>Δt can be either Δτ2 or Δτ3 or an average of the two-recorded values.<br>In the case of significant acceleration or deceleration the vehicle length can be estimated using the relationship<br>$$\text{Vehicle Length} = \text{Vehicle Speed}_{front} \times \Delta\tau + \frac{\text{Acceleration} \times (\Delta\tau)^2}{2}$$<br>Where<br>Acceleration can be either the one calculated when considering the two different time delays, Δτ2 or Δτ3, or the calculated average acceleration.<br>Δτ can be either Δτ2 or Δτ3 or an average of the two-recorded values. |

Speed estimation can be carried out using a variety of methods. The simplest and most straightforward method is the one previously described where the time between the first interruption of laser beam 1 to the first interruption of laser beam 2 is recorded. Given that the beam separation is fixed and can be measured, then the speed of the moving vehicle may be estimated. The disadvantage of this method, when the system shown in FIG. 7 is used, is that the distance between the lines defined by the laser beams is not constant. Therefore, the distance (d) between the beams must be corrected based on the range. For example, if one beam is vertical and the second beam makes an angle θ with respect to the first beam, then the distance the vehicle travels between the laser beams is given by:

$$d + r \sin(\theta)$$

where:
  r —the range to the vehicle as defined in equation (1).

Any error in measuring the range will translate into an error in d. Improvements in the measuring accuracy of the time delay minimizes associated errors.

Another method for estimating the speed of a moving object/vehicle is by recording the range corresponding to every optical pulse and then comparing the two streams of data recorded by the two detectors. This can be accomplished by performing a cross-correlation analysis on the recorded profiles that considers the possibility of acceleration and deceleration during the recording. The result of this analysis will be a better estimate of the time delay ($\tau_s$) that it takes for the vehicle to cross from laser beam 1 to laser beam 2. The analysis may be performed on carefully selected sections of the vehicle or for the whole vehicle profile.

Figure 11:
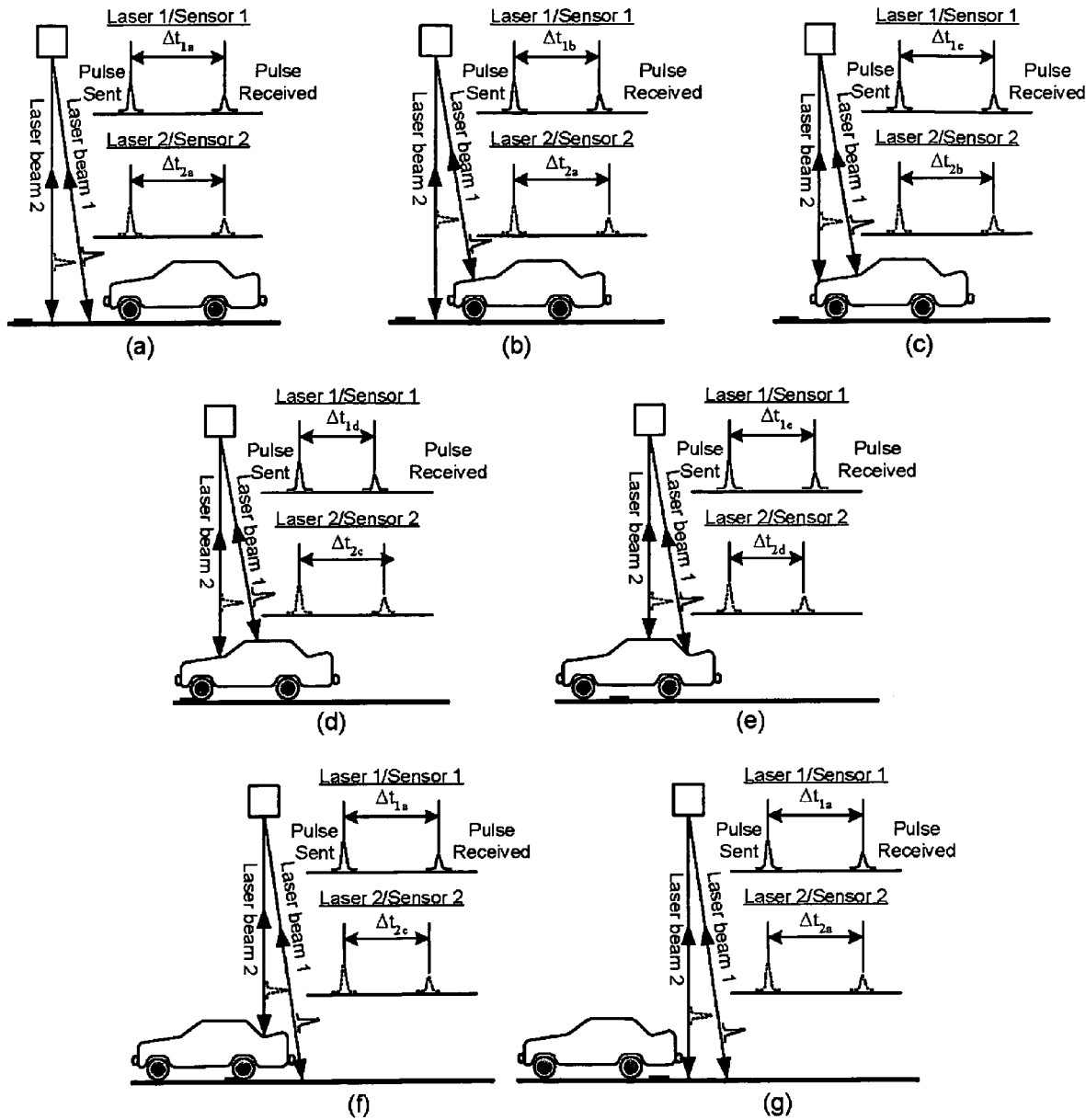
FIGS. 11($a$)-($g$) illustrate schematics for cross correlation analysis of object speed according to a first embodiment of the invention.

The series of schematics in FIGS. 11(a)-(g) illustrates in greater detail how the disclosed system can be used to record the streams of data necessary for the cross correlation analysis. When the lasers beams are not interrupted by any vehicle the recorded time delays for the two laser pulses are constant and correspond to $\Delta t_{1a}$ and $\Delta t_{2a}$ (FIG. 11a). When a moving vehicle intercepts laser beam 1 (FIG. 11b) then the time delay for sensor 1 decreases (since light pulses travels a shorter distance before they get scattered by the vehicle's surface). The time delay corresponding to laser beam 2 remains the same as before. As the vehicle keeps moving, both laser beams are interrupted, and the recorded time delays vary according to where on the vehicle surface each beam hit. (FIGS. 11c thru 11e) Eventually the moving vehicle clears the path for laser beam 1 (FIG. 11f), and the time delay corresponding to laser beam 1 goes back to its original value corresponding to initial range. Finally, the vehicle clears the path for both laser beams (FIG. 11g) and both time delays go back to their original values. In computing the correlation, proper account must be made of the changing distance between the beams with vehicle height because of the angle between the beams.

Figure 12:
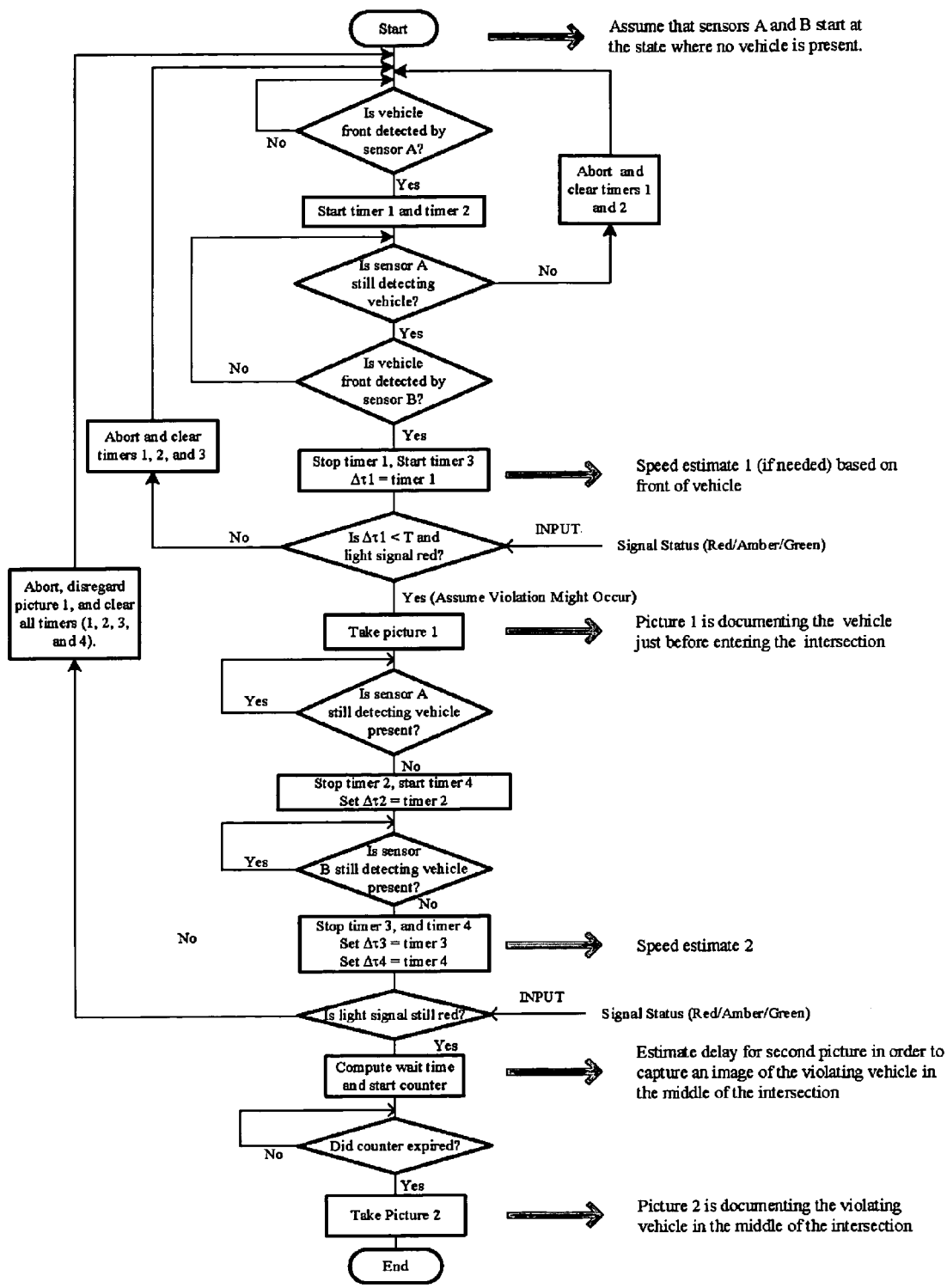
FIG. 12 illustrates a flowchart for detecting and recording a red light violation according to a first embodiment of the invention.

The flowchart shown in FIG. 12 illustrates the sequence of steps that lead to the detection of a "Red Light" traffic violation and the capture of images documenting the violation. The specific setting outlined in the flowchart is one that a vehicle crosses the intersection without stopping and while the traffic light is red. As indicated in the flowchart, the status of the traffic light is an external input and is needed for the decision process. This can be accomplished either by direct hardware connection to the red light control or by installing photodetector/filter combinations to externally detect the status of the traffic light (red, amber, or green). External detection of the traffic light status can be achieved from a distance by incorporating a telescope with the photodetector/filter combinations.

A detailed description of an exemplary process of detecting a vehicle and documenting a violation is presented in Table 4. Notably, the contents of Table 4 present only one step sequence and decision process with the main characteristic that there is no image capturing unless a violation is highly probable. Simpler algorithms can be developed where, even though they might seem to be simpler, image recordings are needed before any indication of a violation will occur.

TABLE 4

A narrative form of the algorithm shown in the flowchart of FIG. 12. The initial assumption is that both sensors A and B start at a state where no vehicle is present.

| Item | Description |
| --- | --- |
| STEP 1 | Check output of sensor A. If the recorded signal strength is equal (or within a small margin) to signal strength corresponding to the road surface signal and the signal's delay with respect to the laser firing corresponds to the road surface, then wait for next recording. If the recorded signal strength is smaller (or in some cases larger) than expected value, and/or the time delay is smaller than the one corresponding to the road surface, then trigger timers 1 and 2 to start. This means that the received signal corresponds to reflected/scattered radiation from the front of a vehicle intercepting the laser beam of sensor A (or in other words the recorded signal corresponds to reflection/scattering from a vehicle). |
| STEP 2 | Check the output of sensor A. If the recorded signal strength and time delay are equal (or within a small margin) to previous recorded value then proceed to next step. If the newly recorded values are considerably different as compared with previous recording, it is an indication that previous recording may have been due to something other than a passing vehicle such as a bird or other flying object. In this case abort the process, clear the timers 1 and 2 and start over (go back to STEP 1). |
| STEP 3 | Check the output of sensor B. If the recorded signal strength is equal (or within a small margin) to the value corresponding to a return from the road surface, and/or the signal's time delay with respect to the laser firing corresponds to the road surface, then wait for next recording. If the recorded signal strength is smaller (or in some cases larger) than expected value, and/or the time delay is smaller than the one corresponding to the road surface, then trigger the timer 1 to stop and timer 3 to start. This means that the received signal corresponds to reflected/scattered radiation from the front of a vehicle intercepting the laser beam of sensor B (or in other words the recorded signal corresponds to reflection/scattering from a vehicle). If the recorded signal is the one corresponding to the road surface then go back to STEP 2. |
| STEP 4 | Record the value of timer 1 ($\Delta\tau 1$) and calculate the speed corresponding to the front of the vehicle using the expression $$\text{Vehicle Speed}_{front} = \frac{d}{\Delta\tau 1}$$ Where: d = beam separation (See FIG. 1) $\Delta\tau 1$ = Recorded timer 1 value corresponding to the time it takes for the front of a vehicle to transverse the laser beam separation d. |
| STEP 5 | If the traffic light signal is red, and the time $\Delta\tau 1$ it took for the front of the vehicle to cross the laser beam separation d is smaller than a predefined time, T, then it is highly probable that a red light violation will occur. (Note: Time T corresponds to a vehicle speed that is fast enough, making it unlikely that the vehicle will be able to stop before the intersection. Therefore, it is assumed that a red light violation will occur). |

TABLE 4-continued

A narrative form of the algorithm shown in the flowchart of FIG. 12. The
initial assumption is that both sensors A and B start at a state where no vehicle is present.

| Item | Description |
|---|---|
| STEP 6 | Take first picture/image of the vehicle documenting the vehicle just before entering the intersection (or in other words before the occurrence of a violation). |
| STEP 7 | Check the output of sensors A and B. If the recorded signal strength values are equal (or within a small margin) to previously recorded values corresponding to a vehicle present and/or the time delay between the received signal and the laser firing signal is shorter than the time delay corresponding to the road surface, then wait for next recording. When recorded signal strength of sensor A is different, usually bigger (or in some cases smaller) than expected value and/or the time delay between the received signal and the laser firing has increased (corresponding to the time delay of the road surface), then trigger the timer 2 to stop (recording ($\Delta t2$) and timer 4 to start counting. This means that the back of a vehicle has stopped blocking laser beam of sensor A. |
| STEP 8 | Check output of sensor B. If the recorded signal strength is equal (or within a small margin) to previously recorded value corresponding to a vehicle present and/or the time delay between the received signal and the laser firing signal is shorter than the time delay corresponding to the road surface, then wait for next recording. If recorded signal strength is larger (or in some cases smaller) than expected value and/or the time delay is bigger than previous recordings (corresponding to the time delay of the road surface) then trigger timers 3 and 4 to stop recording and store values $\Delta \tau 3$ and $\Delta \tau 4$ respectively. This means that the back of a vehicle has unblocked laser beam of sensor B. The recorded value of timer 4 ($\Delta \tau 4$) can be used to calculate the speed of the vehicle using the equation $$\text{Vehicle Speed}_{back} = \frac{d}{\Delta \tau 4}$$ Where: d = beam separation (See FIG. 1) $\Delta \tau 4$ = Recorded timer value corresponding to the time it takes for the back of a vehicle to transverse the laser beam separation d. |
| STEP 9 | If the traffic light signal is still red then proceed to capture more information concerning the violation. If traffic light signal is green, disregard all collected information (clear all timers, and first picture/image) and go back to the beginning. |
| STEP 10 | Using the various recorded time delays and simple calculations (similar to the ones displayed in table 3) one can estimate how long it will take (wait time $t_1$) for the vehicle that violates the red light to approximately reach the middle of the intersection. This wait time provides the input to a counter that is interfaced with the recording media. |
| STEP 11 | Wait until the counter expires and then record the second picture/image of the violating vehicle. |

Figure 13:
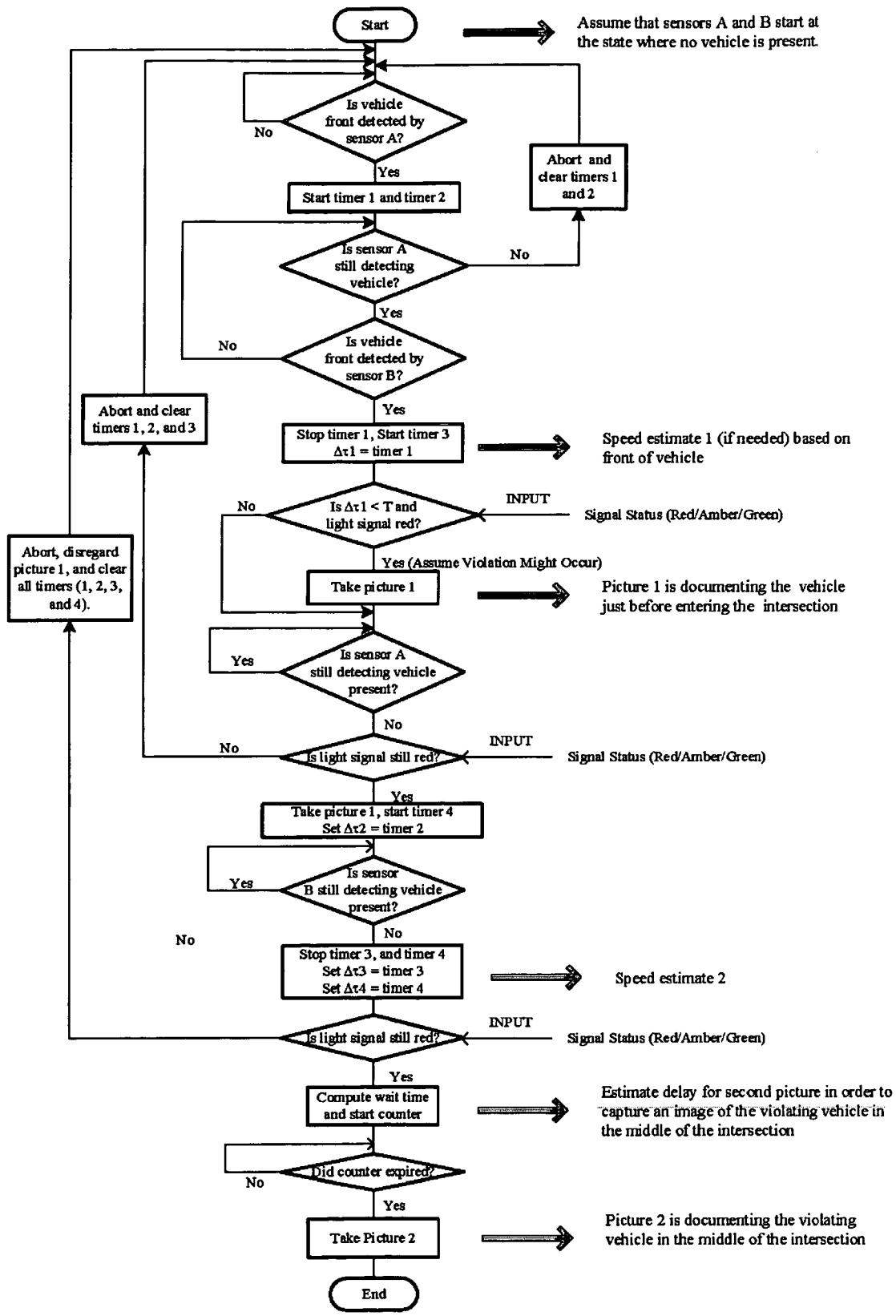
FIG. 13 illustrates a flowchart for detecting and recording a red light violation according to an alternate embodiment of the invention.

The algorithm and decision process presented in the flowchart of FIG. 12 and the narrative of table 4 cover most cases of a vehicle violating a red light signal. There are, however, few circumstances where the described algorithms will fail to capture a violating vehicle. One such case is when a vehicle stops at the red light signal, but then proceeds through the intersection before the traffic light turns green. The flowchart of FIG. 12 can be adapted for addressing this shortcoming by slight modification of the algorithm, which is presented in the flowchart of FIG. 13.

A less complicated version of the system described above is one in which the decision process is only based on the presence or absence of the detected pulses. In other words, if no pulse is detected within the predetermined programmable time interval $\Delta_\tau$, then it is assumed that an object is present. Signal absence may be due to either high absorption of the vehicle's surface, or highly efficient specular reflection, or high transmission of the vehicle's surface, which results in less laser radiation scattering.

Yet another embodiment of the disclosed method and apparatus is a more complex case, but can provide maximum information concerning a moving vehicle. The continuous recording of the time delay for the two laser beams generates a table that contains important information that can be used to evaluate several properties of the moving vehicle. Simple plotting of the inverse of the recorded time delay as a function of time reveals the shape of the car. This process is schematically shown in FIGS. 16(a)-(b). (The recordings of the time delay from both laser beams reveal the shape of the passing vehicle.) Examples of information that can be generated from the recorded data are:

Vehicle length
Vehicle speed
Whether the vehicle was accelerating or decelerating
Vehicle profile.

Figure 15:
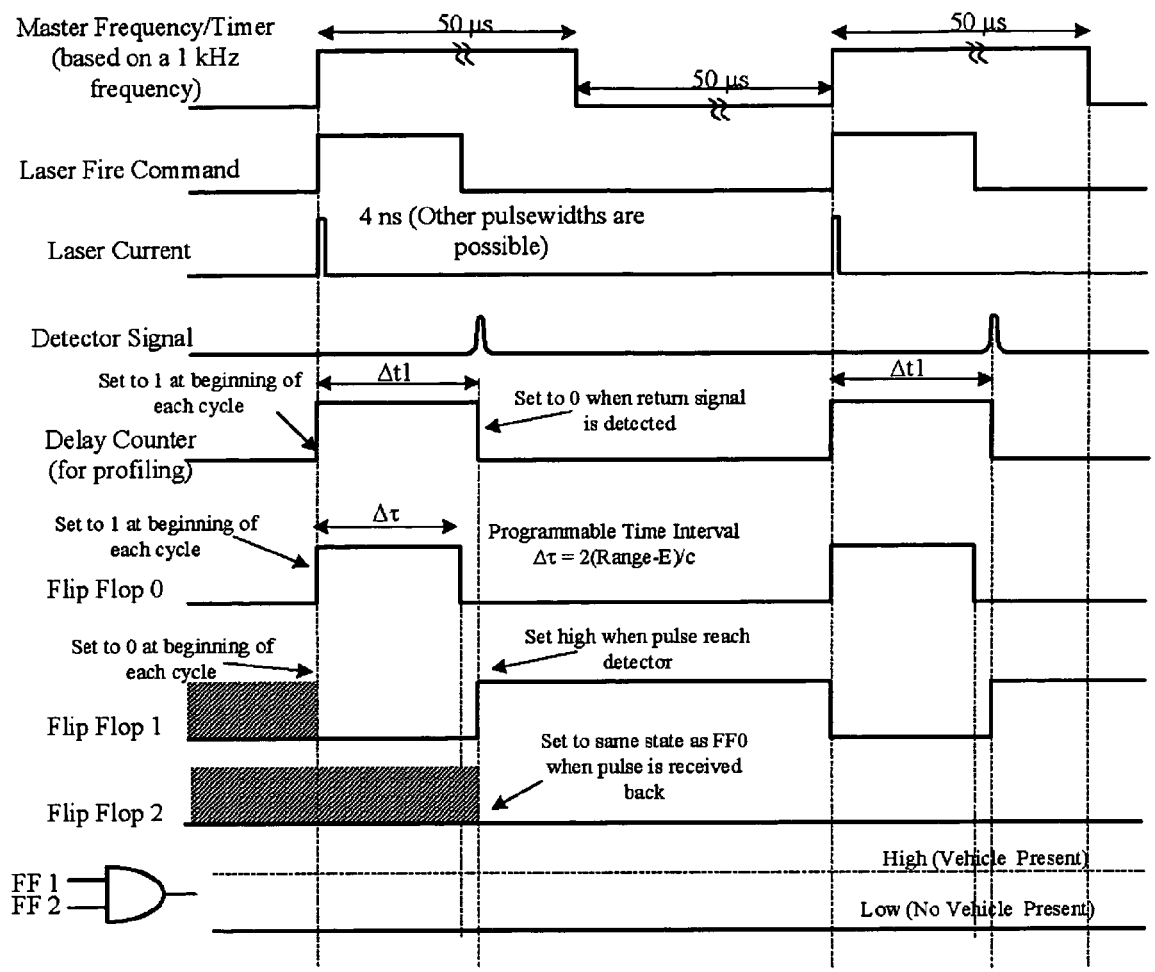
FIG. 15 illustrates a timing diagram detecting absence of an object according to another alternate embodiment of the present invention.
Figure 16:
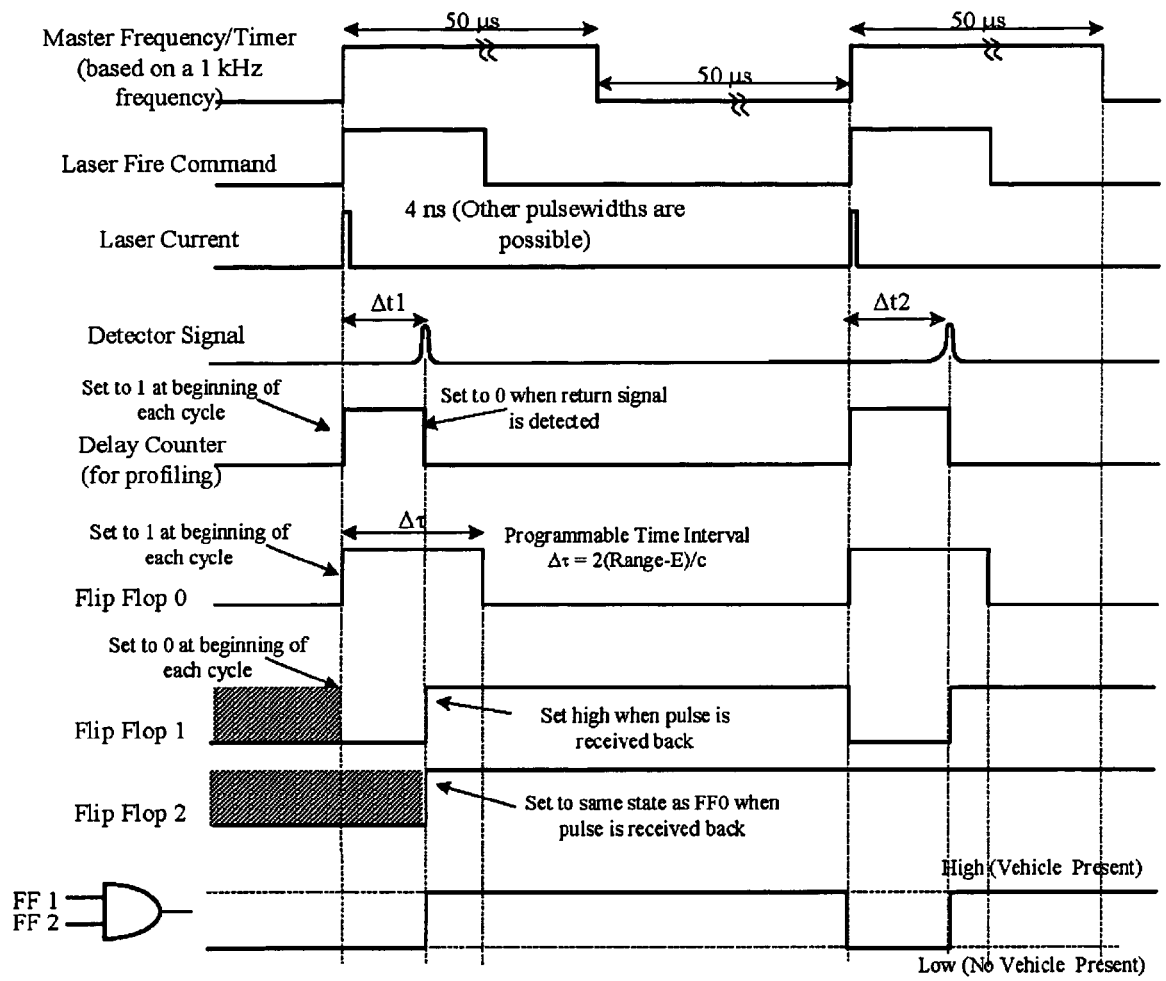
FIG. 16 illustrates a timing diagram detecting presence of an object according to another alternate embodiment of the present invention.

FIGS. 15 and 16 illustrate timing diagrams for continuous recording of the time delay. The number of time delay recordings is a function of several quantities such as:

Vehicle length
Vehicle speed
Frequency of pulses

Figure 17:
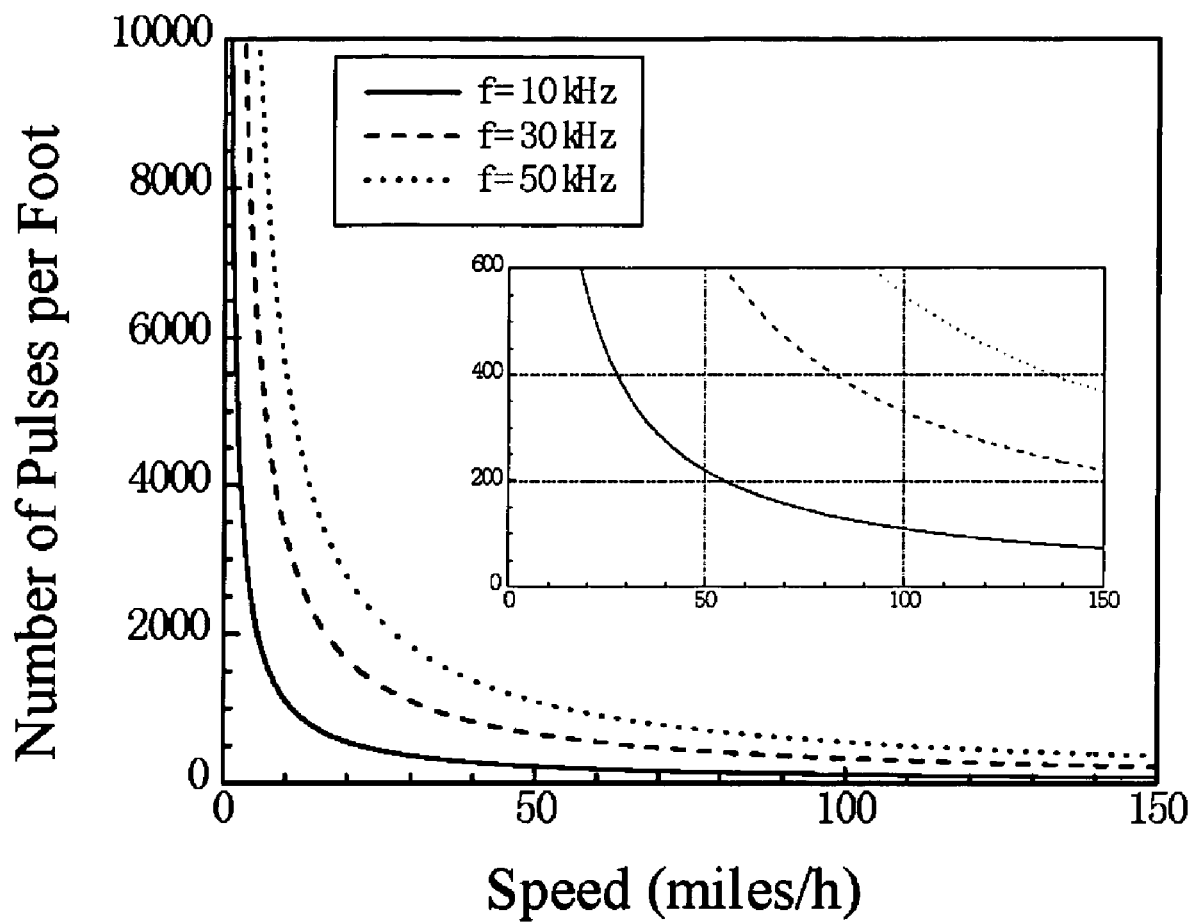
FIG. 17 is a graph of sensor beam pulses per foot of profiled vehicle versus speed of a profiled vehicle according to a first embodiment of the present invention.

The graph in FIG. 17 shows the relationship between the number of pulses per foot of the vehicle length (or possible time delay recordings) as a function of vehicle speed for three pulse frequencies. The disclosed system is able to record 100 points per foot even along a vehicle moving at over 100 miles per hour creating a high-resolution profile of the vehicle. In the case that a specific number of recordings per foot is required rather than all possible information, then this can be accomplished by using information recorded at the beginning, such as vehicle speed, and direct the disclosed system to discard some data.

In an alternate embodiment, a comparable system to the one disclosed above can be built in a different way. Rather than sending laser pulses and waiting for their return, the transmitter can send laser radiation that has undergone an intensity modulation using a repetitive waveform (such as a sinusoidal, triangular, or similar). The laser radiation scatters off the hard surface and a fraction of it is directed into the detector. The phase of the detected radiation depends on the round trip distance, which in turn can be processed in a similar fashion to determine the presence of an object and its speed.

The uncertainty in speed estimation depends on several factors:
Vehicle's speed
Laser beam spot separation (d)
Frequency of laser pulses (f)
Laser beam spot size (g)
There are several ways of controlling the accuracy in speed determination. The disclosed system becomes more accurate by
a. Increasing the separation between the two laser spots
b. Increasing the laser repetition rate
c. Decreasing the laser spot size.

Figure 18:
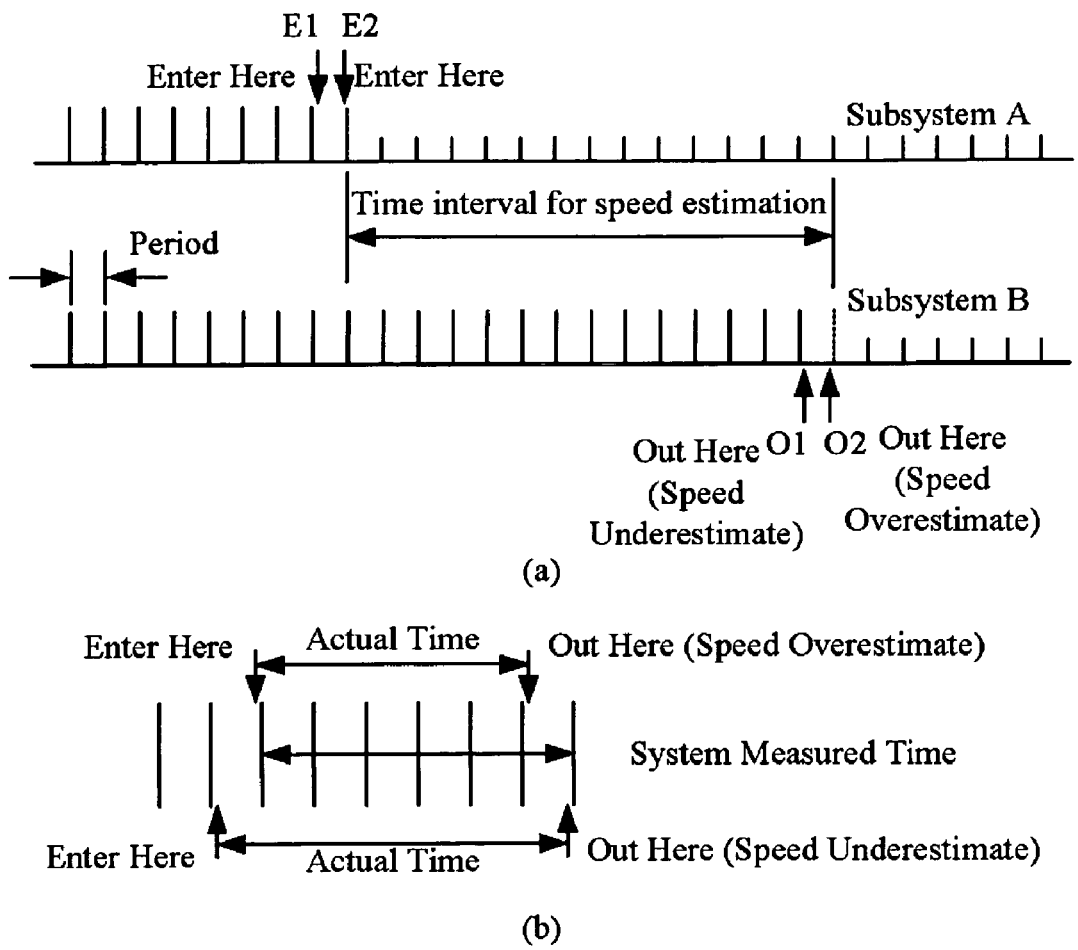
FIGS. 18($a$)-($b$) illustrate general concepts of speed uncertainty due to sensor repetition rate.

FIGS. 18(a) and (b) present the source of the speed estimation uncertainty due to the repetition rate. A vehicle may intercept the beam path of sensor A just after a laser pulse has been reflected/scattered by the asphalt and intersect the beam path of sensor B just before a light pulse hits the asphalt. This will result in a time measurement error equal to the period. In other words, the time it takes for the vehicle to cover the distance d will be larger by one period and as indicated by equation (2) the vehicle's speed will be underestimated. ("E1" and "O1" markings on FIG. 18) Using the same logic there is the possibility of overestimating the speed of a moving vehicle ("E2" and "O2" markings on FIG. 18).

Figure 19:
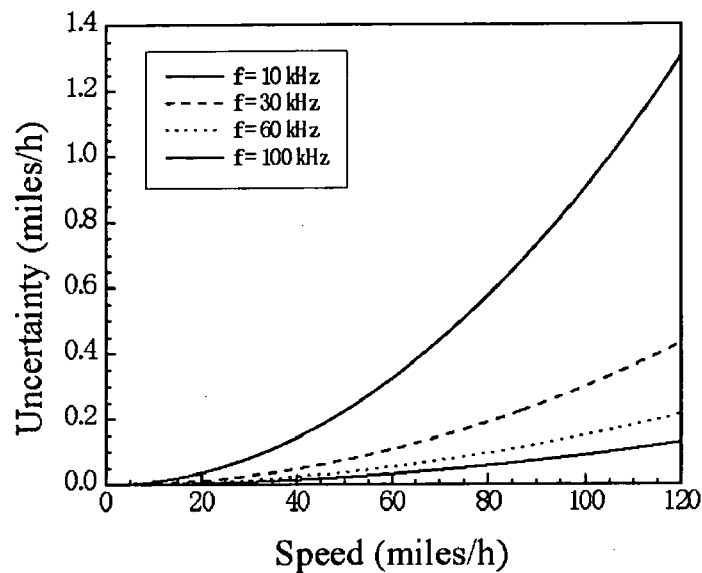
FIGS. 19($a$)-($b$) are graphs of speed estimation uncertainty as a function of object speed according to one embodiment of the present invention.
Figure 19:
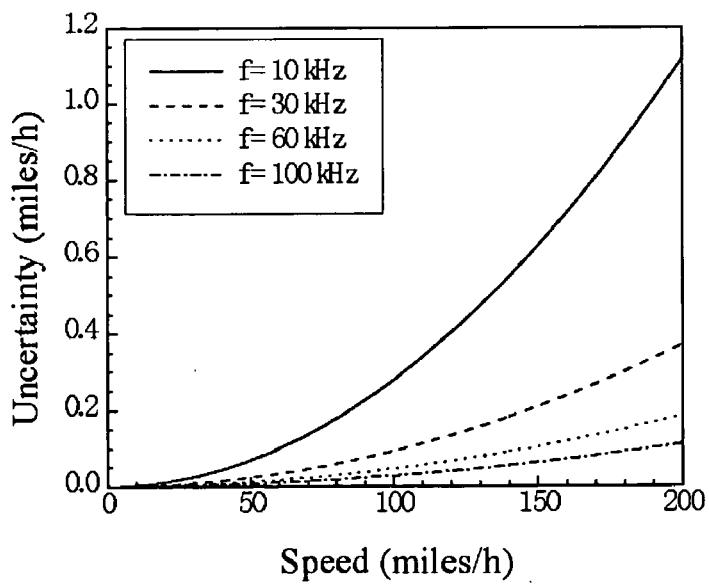

The two graphs shown on FIGS. 19(a) and (b) present the speed uncertainties as a function of the vehicle's speed for various pulse repetition rates. The spot separation was assumed to be one meter and the uncertainty due to the finite size of the laser spots was ignored. During the numerical evaluations, it was assumed that the maximum uncertainty corresponds to one full period.

Figure 20:
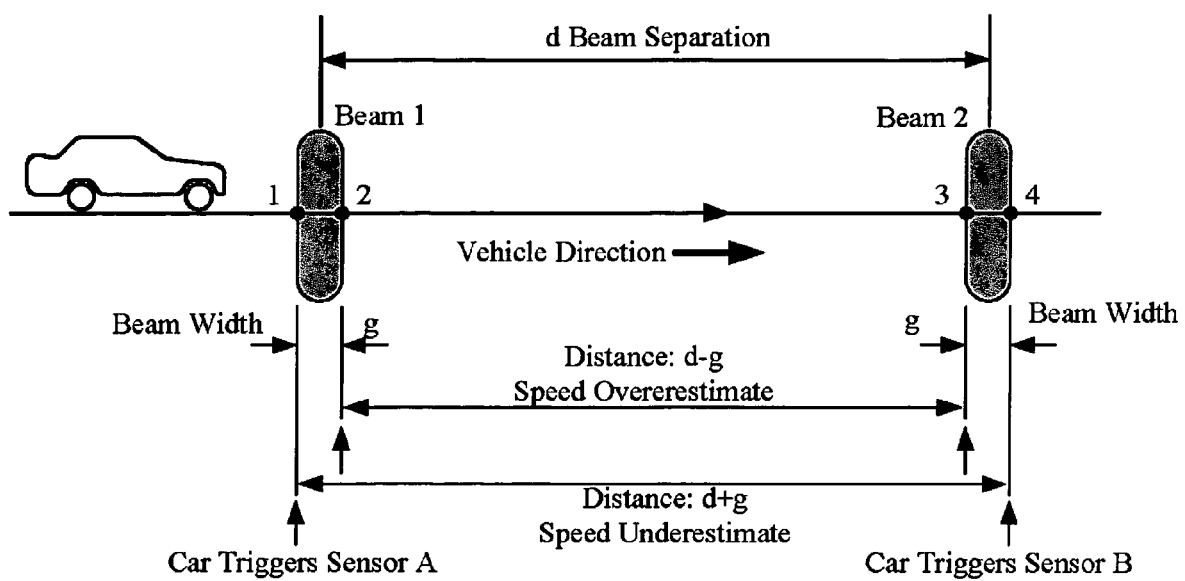
FIG. 20 illustrates general concepts of speed uncertainty due to sensor beam size.

A schematic detailing the speed uncertainty due to the finite spot sizes of the two laser beams is shown in FIG. 20. The source of the uncertainty is the fact that in many situations a sensor may be more sensitive to one part of the beam as compared to another part of the beam. The worst case scenario occurs either when sensor A is more sensitive in point 1 or 2 and sensor B is more sensitive in point 3 or 4, respectively. The maximum uncertainty corresponds to an error in d equal to the size of the beam.

Figure 21:
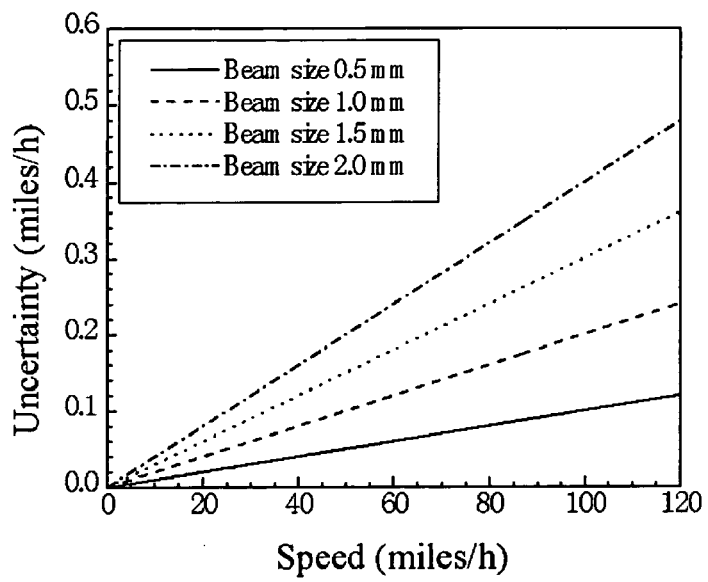
FIGS. 21($a$)-($b$) are graphs of speed estimation uncertainty as a function of sensor beam size according to one embodiment of the present invention.
Figure 21:
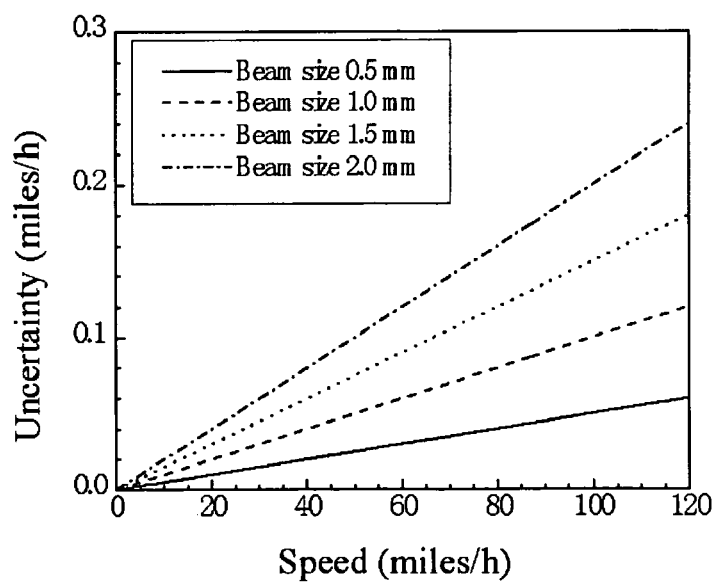

The results of a numerical simulation are shown in the graphs presented in FIGS. 21(a) and (b). It was assumed that the maximum uncertainty corresponds to an increase in the beam separation by an amount equal to the width of the laser spot (See FIG. 20).

One of the main applications for the speed sensor discussed above is red light photo enforcement. The simplest two-laser beam speed sensor has one of the laser beams vertical (or perpendicular with respect to the road surface) while the second laser beam is at a slight angle as compared to the other beam (see FIG. 7). An important system parameter is the value of "E", which represents the minimum height for detection. Below this height, no vehicle detection is possible. In terms of time delay, there will be no measurement unless there is a decrease in the recorded time delay that corresponds to a height bigger than E.

Figure 22:
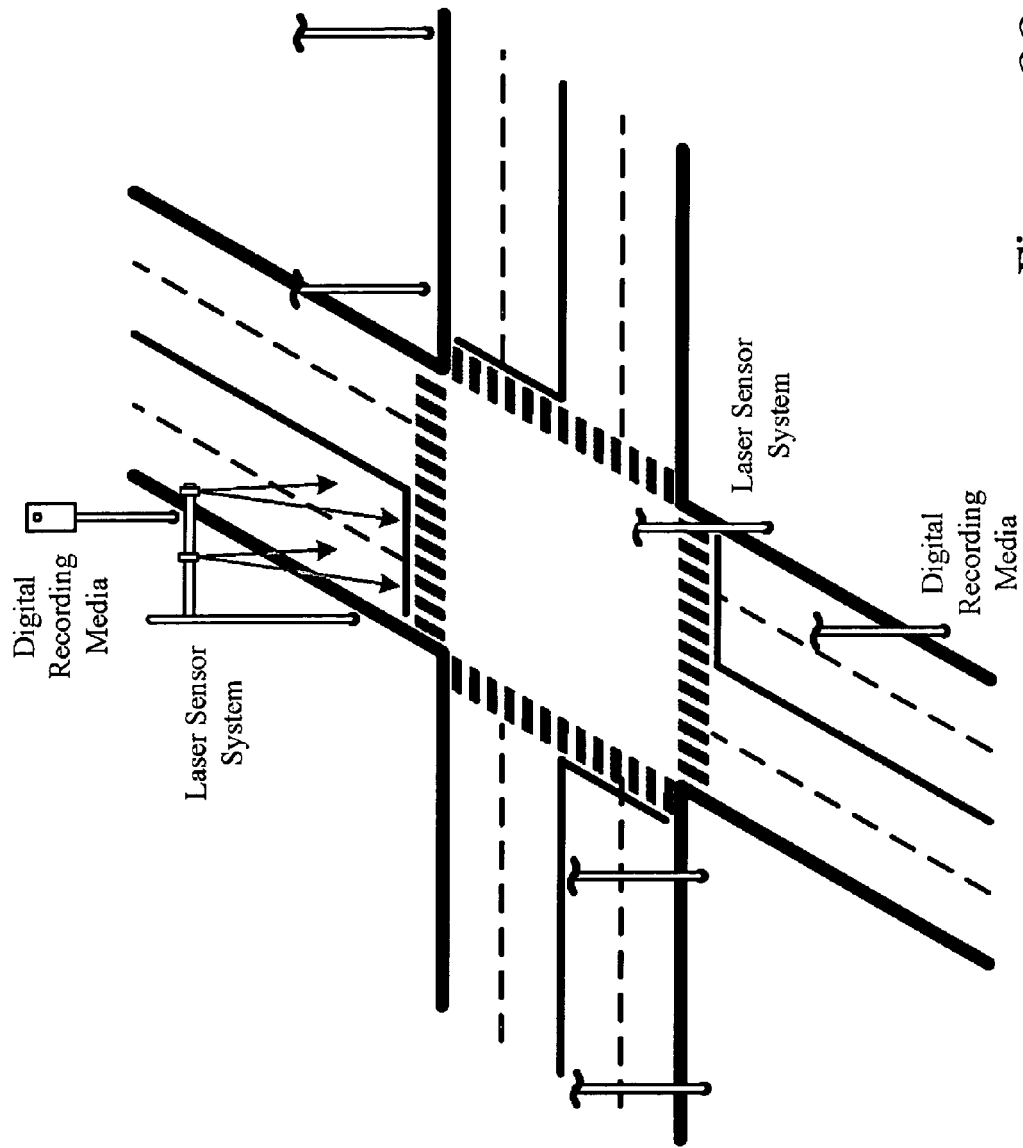
FIG. 22 illustrates schematic views of monitoring and violation detection system positioning options according to various embodiments of the present invention.

The use of the speed sensor for red light photo-enforcement is schematically predicted in FIG. 22. The speed sensors are installed above the street (at a height between 16 and 20 feet) and close to the intersection for monitoring the speed of the passing vehicles (just before entering the intersection). Information generated by the speed sensor is communicated through an appropriate interface to a central computer, which is located in the same cabinet as the digital recording media. The status of the traffic light is also communicated to the central computer in order to aid the decision making process.

The process of detecting and recording a traffic violation starts with sensing the status of the traffic light. When the traffic light is red then the speed of passing vehicles is estimated. If the vehicle's speed is lower than a critical value then it means that the vehicle will be able to stop before the intersection. In this case, no image recording takes place. On the other hand, if the vehicle's speed is above a critical value then the probability of stopping before the intersection is minimum, and the process of recording the violation starts. The violation recording may consist of still images of the vehicle before and during the traffic violation as well as a short video clip documenting the violation.

Figure 23:
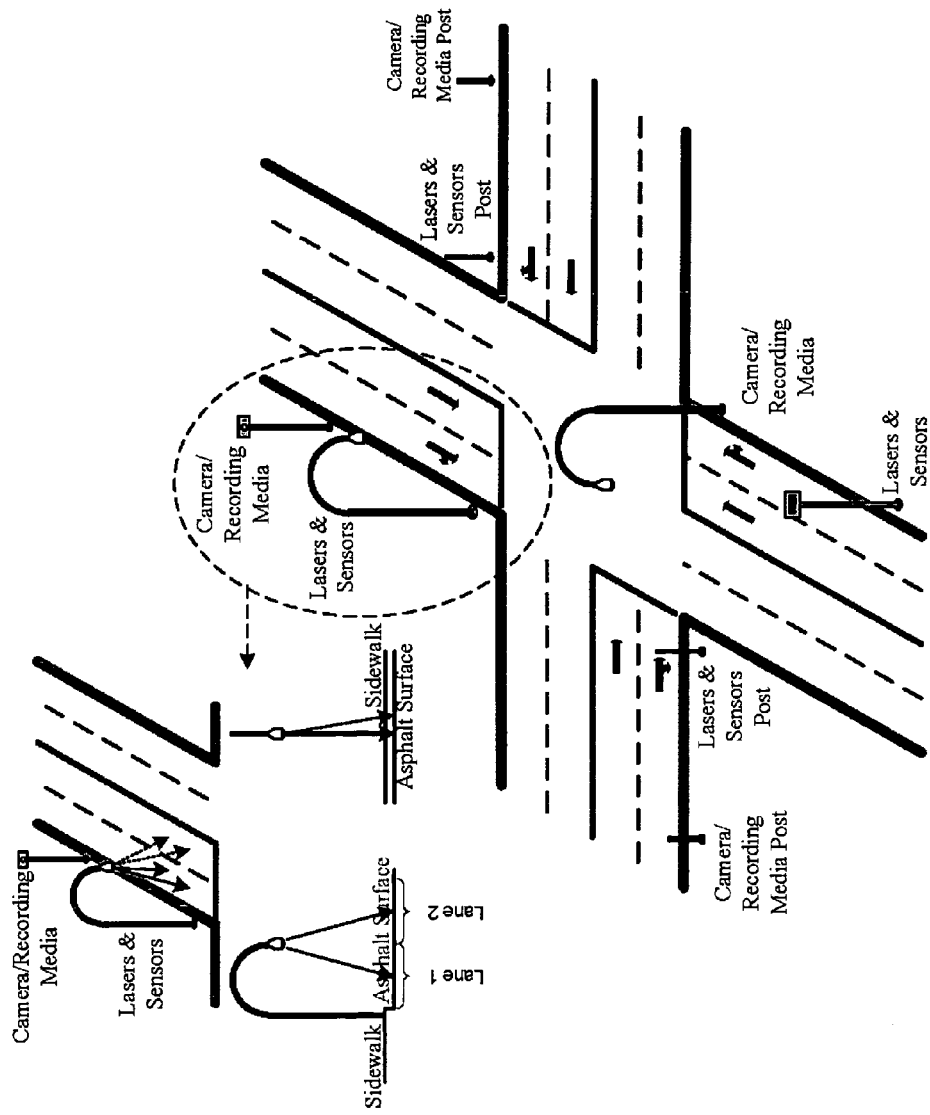
FIG. 23 illustrates typical two-lane architecture for a monitoring and violation detection system according to an embodiment of the present invention.

The compactness of the disclosed system allows multiples of the system to be package into a single housing, and the system can be used in an intersection for "Red Light Violation Detection and Recording". An example of a two-lane configuration using the system, coupled with a recording mechanism for documenting red light violations is shown in FIG. 23. The details of the laser beam arrangement are shown in the insert. The compactness of the system enables multiple systems to be placed in a single housing, thus servicing more than one lane.

Figure 24:
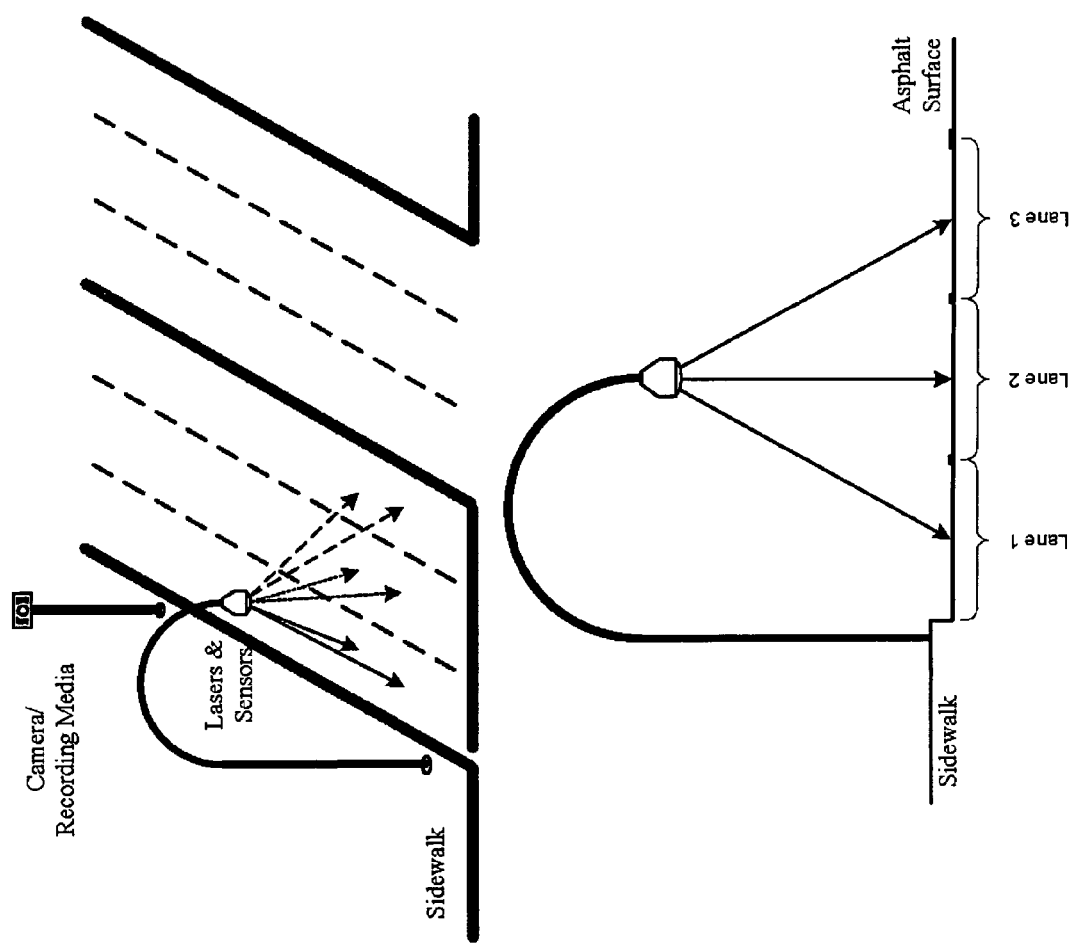
FIG. 24 illustrates typical three-lane architecture for a monitoring and violation detection system according to an embodiment of the present invention.

The exact height for placing the system is subject to local codes and laws. For convenience, during the analysis of the disclosed system, a hanging height between 16-20 feet was assumed. (According to the commercial drivers license study guide no vehicle can exceed a height of 14 feet.) Another important feature of the disclosed arrangement is the ease of disguise. It is feasible to design a street lighting feature that would be able to house both a light bulb as well as the disclosed system. This will provide maximum camouflage. Similar to a two-lane configuration the disclosed system can be used in a three-lane intersection. The schematic in FIG. 24 displays some of the details of a three-lane system. In the case of a four-lane intersection where all lanes need to be instrumented it is anticipated that two light-posts (as the one shown in the figures) will be used, each supporting a two-lane system housing.

Figure 25:
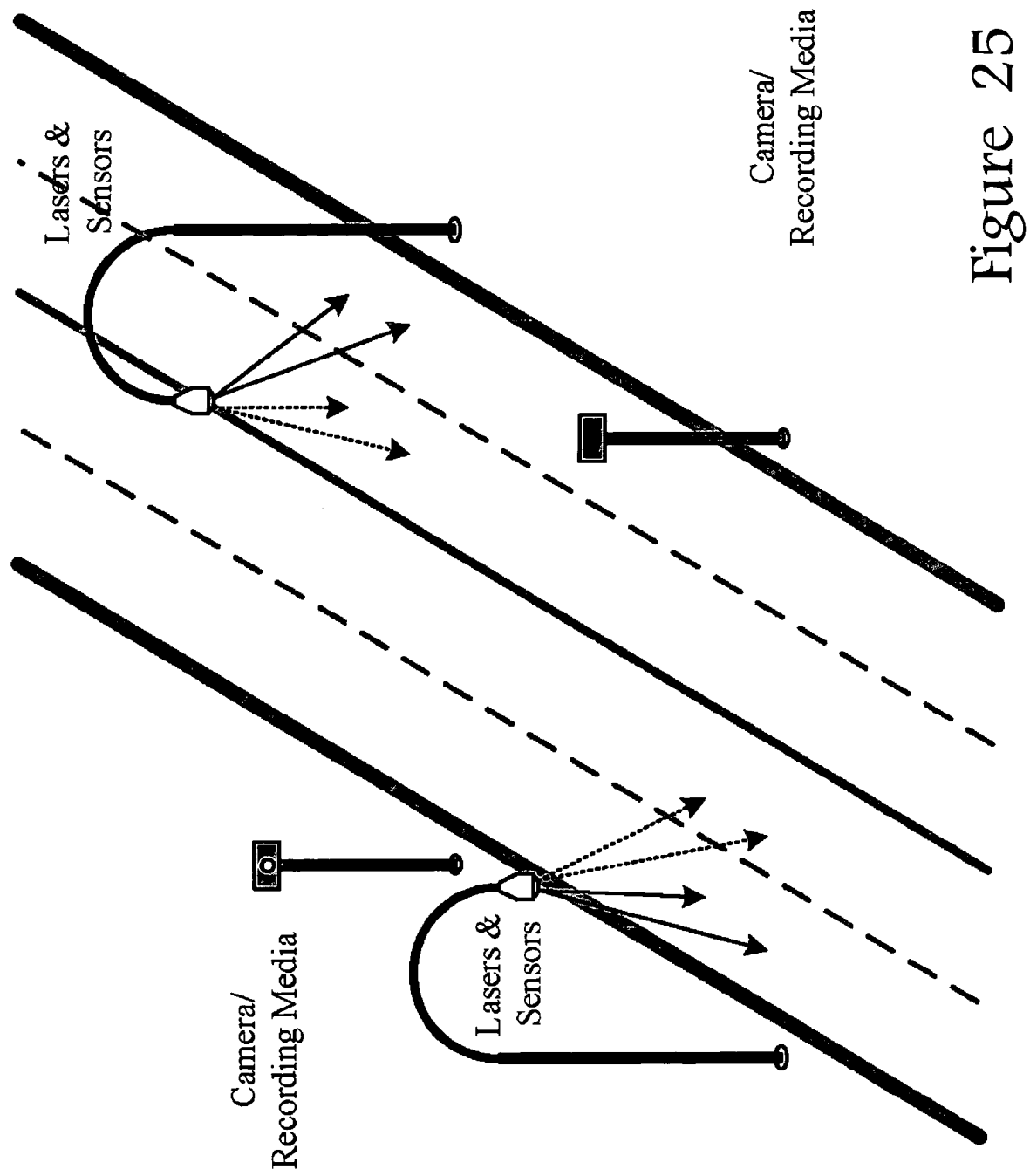
FIG. 25 illustrates typical two-lane architecture for a speed monitoring and violation detection system according to an embodiment of the present invention.

Another possible application for the disclosed system is its potential use for speed violation detection and speed photo enforcement in urban and rural areas as well as highways. FIG. 25 presents a possible arrangement of the disclosed system in speed photo enforcement configuration. The speed photo enforcement system consists of a lens system per lane and a recording mechanism. Contrary to the system dedicated for red light camera photo enforcement, no input is necessary and the algorithm for violation detection is simplified and is always on. The only criterion is whether a passing vehicle exceeds the speed limit. The systems can be strategically positioned to enforce speed limits close to street intersection or close to pedestrian street crossing. Another potential application is close to schools.

Additionally, a variety of laser systems can be used for the construction of the disclosed system. The prime candidates are diode lasers due to their small size, low cost, rugged package, ability to operate in harsh environments, ease of installation and maintenance-free operation. Diode laser sources where the light emitting area is rectangular (and are currently well developed) offer the additional advantage that they can be focused to very narrow lines on the road surface. The maximum advantage is realized when the long side of the rectangular focusing spot is arranged perpendicular to the traffic direction, which also minimizes the speed uncertainty due to spot size.

Even though there is no specific wavelength requirement for the disclosed system, lasers operating in the wavelength region between 0.8 µm to 2 µm are preferred. The main reason is the fact that these wavelengths are invisible to the human eye, therefore eliminating the possibility of obstructing the drivers.

As is the case with laser sources, there is a great variety of sensors that can be used for the disclosed systems. Some examples are avalanche photodiodes (analogue mode or "Geiger mode,") photodiodes, and photomultipliers. Mainly the choice of light detector depends on the operating wavelength.

Concerning the road surface, it is well published that the scattering efficiency of asphalt is typically between 5% and 15%. Numerical simulations and experimental investigation performed indicated that even the low end of scattering efficiency is sufficient for operation of the disclosed system. Special reflective tapes or road paints developed by a variety of vendors can be also used to enhance scattering efficiency and improve the operating characteristics of the disclosed system.

Lastly, the disclosed system can be easily configured to work as an autonomous portable device for traffic monitoring, vehicle speed determination, and speed violation detection and recording. Such a device can operate using batteries or a small portable electrical generator depending on the duration of needed operation. Possible applications of a portable system may be areas where road construction and maintenance is performed. A portable system may also provide a useful tool for preliminary investigation and feasibility studies of traffic light intersections and highways before permanent installation is carried out.

The invention has been described with references to a preferred embodiment. While specific values, relationships, materials and steps have been set forth for purposes of describing concepts of the invention, it will be appreciated by persons skilled in the art that numerous variations and/or modifications may be made to the invention as shown in the specific embodiments without departing from the spirit or scope of the basic concepts and operating principles of the invention as broadly described. It should be recognized that, in the light of the above teachings, those skilled in the art can modify those specifics without departing from the invention taught herein. Having now fully set forth the preferred embodiments and certain modifications of the concept underlying the present invention, various other embodiments as well as certain variations and modifications of the embodiments herein shown and described will obviously occur to those skilled in the art upon becoming familiar with such underlying concept. It is intended to include all such modifications, alternatives and other embodiments insofar as they come within the scope of the appended claims or equivalents thereof. It should be understood, therefore, that the invention may be practiced otherwise than as specifically set forth herein. Consequently, the present embodiments are to be considered in all respects as illustrative and not restrictive.

What is claimed is:

1. A device for sensing an object on a surface, comprising:
   a first laser focused through a single lens on said surface;
   a first controller which controls radiation emission from said first laser;
   a first detector arranged which receives at least a portion of radiation emitted from said first laser and reflected or scattered back through said single lens and which provides a first signal upon receiving said portion of radiation emitted from said first laser;
   a second laser focused through said single lens on the surface;
   a second controller which controls radiation emission from said second laser;
   a second detector which receives at least a portion of radiation emitted from said second laser and reflected or scattered back through said single lens and which provides a second signal upon receiving said portion of radiation emitted from said second laser;
   a processor which analyzes said first signal and said second signal, said processor being operationally attached to said first controller, said second controller, said first detector, and said second detector;
   a recording device including a camera which receives an output from said processor and documents information about said object on said surface; and
   a traffic signal status detector which obtains a status of a traffic control signal;
   wherein, said processor analyzes first signal and said second signal to detect said object on said surface and provides an output indicative of a range to said object if detected on said surface, measure, at least one time delay between said first signal and said second signal, calculates a velocity of said object if detected on said surface using said at least one measured time delay, and obtains said status of said traffic control signal from said traffic signal status detector; and
   wherein, if said obtained status of said traffic control signal is such that said object on said surface should stop before a traffic violation occurs said processor triggers said camera and records at least one picture of said object on said surface, calculates an amount of time for said object to travel a predetermined distance on said surface, and triggers said camera to take at least one additional picture of said object on said surface.

2. The device according to claim 1, wherein said first laser and said second laser comprise a laser diode.

3. The device according to claim 1, further comprising:
   a mirror with at least one aperture which enables radiation from at least one of said first laser and said second laser to pass therethrough, said mirror being aligned to reflect radiation reflected or scattered back through said lens to at least one of said first detector and said second detector.

4. The device according to claim 3, wherein a dimension of the at least one aperture in said mirror is sized and configured such that only eye-safe radiation levels are allowed to pass therethrough.

5. The device according to claim 1, wherein at least one of said first and said second laser is focused in a narrow rectangular spot on said surface with a long side of said rectangular spot being aligned perpendicular to a travel path of said object on said surface.

6. A system for sensing an object moving along a path and recording information about said object, said system comprising:
- a first laser and a second laser focused through a single lens on a surface of said path;
- a first controller and a second controller which control radiation emission from said first laser and said second laser, respectively;
- a first detector and a second detector which receive at least a portion of radiation emitted from said first laser and said second laser respectively and reflected back through said single lens and which provide a first signal and a second signal respectively upon receiving said portions of radiation emitted from said first laser and said second laser respectively;
- a processor which analyzes said first signal and said second signal, said processor being operationally attached to said first control, said second controller, said first detectors and said second detector;
- a recording device including a camera which receives an output from said processor and documents information about said object along said path; and
- a traffic signal status detector which obtains a status of a traffic control signal;
- wherein, said processor analyzes said first signal and said second signal to detect said object along said path and provides an output indicative of a range to said object detected along said path, measure at least one time delay between said first signal and said second signal, calculates a velocity of said object detected along said path using said at least one measured time delay, and obtains said status of said traffic control signal from said traffic signal status detector; and
- wherein, if said obtained status of said traffic control signal is such that said object if detected along said, path should stop before a traffic violation occurs said processor triggers said camera and recording at least one picture of said object along said path, calculates an amount of time for said object to travel a predetermined distance along said path, and triggers said camera to at least one additional picture of said object along said path.

7. The system according to claim 6, further comprising:
- a mirror with at least one aperture to enable radiation from at least one of said first laser and second laser to pass therethrough, said mirror being aligned to reflect radiation reflected back through said lens to at least one of said first detector and said second detector.

8. The system according to claim 7, wherein the size of the at least one aperture in said mirror is sized and configured such that only Class 1 or 2 radiation levels, as defined by FDA 21 CFR 1040.10 are allowed to pass therethrough.

9. The system according to claim 6, said processor further comprising:
- at least one time delay counter which measures a time from radiation transmission by at least one of said first laser and said second laser to radiation detection by at least one of said first detector and said second detector respectively.

10. The system according to claim 9, wherein said processor determines if an object is present on said path.

11. The system according to claim 10, wherein said processor provides output to said recording device to determine a profile of said object.

12. The system according to claim 9, wherein said first laser and said second laser are focused on different points on said surface of said path and wherein said points are separated by a known distance.

13. The detector system according to claim 12, wherein at least one of said first laser and said second laser is focused in narrow rectangular spot on said surface of said path with a long side of said rectangular spot being aligned perpendicular to said path of said object on said surface of said path.

14. A method of determining speed of an object along a path, comprising:
- providing a first laser and a second laser focused respectively through a single lens on a first focus point and a second focus point on a surface of said path;
- controlling radiation emission from said first and second lasers;
- detecting at least a portion of radiation emitted from said first and second laser and reflected back through said single lens and providing a signal upon receiving said radiation;
- processing said signal to detect the presence of an object on said path; and
- displaying an output indicating the presence of said object if detected;
- detecting said object with said first laser;
- detecting said object with said second laser;
- measuring a time delay between detecting by said first laser and detecting by said second laser; and
- calculating a velocity of said object based on a front of said object by dividing a known distance between said first focus point and said second focus point by said time delay between detecting by said first laser and detecting by said second laser
- ceasing detecting said object with said first laser;
- ceasing detecting said object with said second laser;
- measuring the time delay between ceasing detecting by said first laser and ceasing detesting by said second laser; and
- calculating the velocity of said object based on a back of said object by dividing said known distance between said first focus points and said second focus point by said time delay between ceasing detecting by said first laser and ceasing detecting by said second laser;
- obtaining an input indicating a status of a traffic control signal;
- if the traffic control signal indicates that said object on said surface of said path should stop and said velocity of said object is such that it is unlikely that the object can stop before a violation occurs, triggering an imaging device and recording at least one picture of said object;
- calculating an amount of time for said object to travel a predetermined distance; and
- taking at least one additional picture of said object;
- wherein said signal upon receiving said radiation comprises a time delay.

15. The method according to claim 14, wherein at least one of said first laser and said second laser is focused in narrow rectangular spot on said surface with a long side of said rectangular spot being aligned perpendicular to a travel path of an object on said surface.

16. The method according to claim 14, said providing step further comprising:
- providing a mirror with at least one aperture to enable radiation form at least one of said first laser and said second laser to pass therethrough, said mirror being aligned to reflect radiation reflected back through said single lens to at least one of said first detector and said second detector.

17. The method according to claim 14, said processing step further comprising:

calculating a height of the object if the time delay for receiving said radiation is less than an expected time delay if no object is present.

18. The method according to claim 14, further comprising the steps of calculating an acceleration of said object by determining a difference between said velocity calculated based on said front of said object and said velocity calculated based on said back of said object and dividing by a time period between starting detection of said object by said first laser and ceasing detecting of said object by said first laser.

19. The method according to claim 14, further comprising a step of calculating an average velocity of said object along said path.

20. The method according to claim 18, further comprising a step of calculating an average acceleration of said object along said path.

21. The method according to claim 14, wherein the status of the traffic control signal is obtained by a traffic signal status detector using a line of sight observation of said traffic control signal.

22. The device according to claim 1, wherein the device for sensing said object on said surface is arranged as an autonomous transportable device including an integrated electric power source.

23. The system according to claim 6, wherein, the system for sensing said object on said surface is arranged as an autonomous transportable system including an integrated electric power source.

24. The system according to claim 6, wherein the system, for sensing said object on said surface is arranged as an autonomous transportable system for traffic monitoring, and wherein, said recording device includes a digital recording media collocated on a support structure of said traffic monitoring system.

* * * * *